(12) United States Patent
Goh

(10) Patent No.: US 7,580,519 B1
(45) Date of Patent: Aug. 25, 2009

(54) TRIPLE DES GIGABIT/S PERFORMANCE USING SINGLE DES ENGINE

(75) Inventor: Joon-Kit Goh, Singapore (SG)

(73) Assignee: Advanced Micro Devices, Inc., Sunnyvale, CA (US)

( * ) Notice: Subject to any disclaimer, the term of this patent is extended or adjusted under 35 U.S.C. 154(b) by 984 days.

(21) Appl. No.: 10/730,640

(22) Filed: Dec. 8, 2003

(51) Int. Cl.
*H04L 9/28* (2006.01)
(52) U.S. Cl. ............................... 380/29; 380/42
(58) Field of Classification Search ............. 380/28–29, 380/42
See application file for complete search history.

(56) References Cited

U.S. PATENT DOCUMENTS

| | | | |
|---|---|---|---|
| 4,731,843 A | 3/1988 | Holmquist | |
| 5,099,517 A * | 3/1992 | Gupta et al. .................. | 380/29 |
| 5,351,299 A | 9/1994 | Matsuzaki et al. | |
| 5,381,480 A | 1/1995 | Butter et al. | |
| 5,671,284 A | 9/1997 | Buer | |
| 6,314,186 B1 | 11/2001 | Lee et al. | |
| 6,324,286 B1 | 11/2001 | Lai et al. | |
| 6,728,827 B2 | 4/2004 | Yamauchi et al. | |
| 6,874,054 B2 * | 3/2005 | Clayton et al. .............. | 710/310 |
| 6,947,558 B1 | 9/2005 | Graunke et al. | |
| 6,950,517 B2 | 9/2005 | Hawkes et al. | |
| 6,959,086 B2 | 10/2005 | Ober et al. | |
| 6,985,581 B1 | 1/2006 | Callum | |
| 6,985,582 B1 | 1/2006 | Sano et al. | |
| 7,142,671 B2 * | 11/2006 | Qi et al. ........................ | 380/29 |
| 7,212,631 B2 | 5/2007 | Averbuj et | |
| 7,280,657 B2 | 10/2007 | Anand | |
| 2002/0003876 A1 | 1/2002 | Lim | |
| 2002/0061107 A1 | 5/2002 | Tham et al. | |
| 2002/0078342 A1 | 6/2002 | Matthews, Jr. | |
| 2002/0141585 A1 | 10/2002 | Carr | |
| 2002/0159599 A1 | 10/2002 | Matsui et al. | |
| 2003/0002664 A1 | 1/2003 | Anand | |
| 2003/0053623 A1 | 3/2003 | McCanny et al. | |
| 2003/0093684 A1 | 5/2003 | Kaiserswerth et al. | |
| 2003/0108205 A1 | 6/2003 | Joyner et al. | |
| 2003/0156715 A1 | 8/2003 | Reeds, III et al. | |
| 2003/0169877 A1 * | 9/2003 | Liu et al. ...................... | 380/28 |
| 2004/0019619 A1 | 1/2004 | Buer et al. | |
| 2004/0030889 A1 | 2/2004 | Chin et al. | |

(Continued)

OTHER PUBLICATIONS

"Ipsec Coprocessor (IPSEC) Technical Data Sheet", Cadence Design foundry (UK) Ltd., Oct. 2002, 3 pgs.

(Continued)

*Primary Examiner*—Gilberto Barron, Jr.
*Assistant Examiner*—Venkat Perungavoor
(74) *Attorney, Agent, or Firm*—Eschweiler & Associates, LLC

(57) ABSTRACT

Security processing circuits are discussed which may be used alone or as part of a network interface device of a host system using a single DES engine to accomplish 3DES processing. The security processing circuit is adapted for selectively encrypting outgoing data and decrypting incoming data, where the network interface device may be fabricated as a single integrated circuit chip. Methods are also provided for performing 3DES encryption and decryption services between the host system and a network, in which security information is obtained from the host system, which is used together with a set of secret keys for 3DES processing data utilizing a single DES engine and an intermediate result fed back to the single DES engine of the 3DES IPsec circuit.

24 Claims, 15 Drawing Sheets

U.S. PATENT DOCUMENTS

2004/0208314 A1* 10/2004 Patariu et al. ............... 380/37
2004/0228479 A1    11/2004 Crispin et al.
2005/0160050 A1*  7/2005 Payne .......................... 705/64
2005/0175175 A1    8/2005 Leech

OTHER PUBLICATIONS

Office Action issued on Jan. 2, 2008 for U.S. Appl. No. 10/660,966.
Office Action issued on Jul. 6, 2007 for U.S. Appl. No. 10/730,681.
Office Action dated Apr. 4, 2008 issued to U.S. Appl. No. 10/730,681.

* cited by examiner

*Feistel Cipher*

99

| Scheme A | Improved Scheme B |
|---|---|
| Path1 (1st 8 steps) | Path1 (1st 8 steps) |
| PB | 8 Cipher Blks |
| MuxA | PDO Mux |
| 8 Cipher Blks | |
| | |
| | |
| Path2 (2nd 8 steps) | Path2 (2nd 8 steps) |
| MuxA | 8 Cipher Blks |
| 8 Cipher Blks | DI Mux |
| | |
| | |
| | |
| Path3 (loopback for 3DES) | Path3 (equivalent- 1 or 2) |
| PB | 8 Cipher Blks |
| MuxA | DI Mux or PDO Mux |
| 8 Cipher Blks | |
| IPB | |
| DI Mux | |
| PathDO | PathDO |
| IV XOR | IPB |
| DO Mux | IV XOR |
| | DO Mux |
| | |
| | |
| PathSK | PathSK |
| 8 Cipher Blks | 8 Cipher Blks |
| | PDO Mux |
| | |

Fig. 1K

TRIPLE DES GIGABIT/S PERFORMANCE USING SINGLE DES ENGINE

RELATED APPLICATIONS

This application is related to U.S. patent application Ser. No. 10/730,681, filed on Dec. 12, 2003, entitled "TRIPLE DES CRITICAL TIMING PATH IMPROVEMENT."

FIELD OF INVENTION

The invention is generally related to the field of computer or network devices and more particularly to methods and systems for providing a Triple DES cryptographic circuit or device utilizing a single DES engine capable of providing gigabit/s IPsec security processing within a host network interface.

BACKGROUND OF THE INVENTION

Host-computing systems, such as personal computers, are often operated as nodes on a communications network, where each node is capable of receiving data from the network and transmitting data to the network. Data is transferred over a network in groups or segments, wherein the organization and segmentation of data are dictated by a network operating system protocol, and many different protocols exist. In fact, data segments that correspond to different protocols can coexist on the same communications network. In order for a node to receive and transmit information packets, the node is equipped with a peripheral network interface device, which is responsible for transferring information between the communications network and the host system. For transmission, a processor unit in the host system constructs data or information packets in accordance with a network operating system protocol and passes them to the network peripheral. In reception, the processor unit retrieves and decodes packets received by the network peripheral. The processor unit performs many of its transmission and reception functions in response to instructions from an interrupt service routine associated with the network peripheral. When a received packet requires processing, an interrupt may be issued to the host system by the network peripheral. The interrupt has traditionally been issued after either all of the bytes in a packet or some fixed number of bytes in the packet have been received by the network peripheral.

Networks are typically operated as a series or stack of layers or levels, where each layer offers services to the layer immediately above. Many different layered network architectures are possible, where the number of layers, the function and content of each layer may be different for different networks. The international standards organization (ISO) has developed an open systems interconnection (OSI) model defining a seven layer protocol stack including an application layer (e.g., layer 7), a presentation layer, a session layer, a transport layer, a network layer, a data link layer, and a physical layer (e.g., layer 1), wherein control is passed from one layer to the next, starting at the application layer in one station, proceeding to the bottom layer, over the channel to the next station and back up the hierarchy. The user of a host system generally interacts with a software program running at the uppermost (e.g., application) layer and the signals are sent across the network at the lowest (e.g., physical) layer.

One popular network architecture is sometimes referred to as a TCP/IP stack, in which the application layer is one of FTP (file transfer protocol), HTTP (hyper text transfer protocol), or SSH (secure shell). In these networks, the transport layer protocol is typically implemented as transmission control protocol (TCP) or user datagram protocol (UDP), and the network layer employs protocols such as the internet protocol (IP), address resolution protocol (ARP), reverse address resolution protocol (RARP), or internet control message protocol (ICMP). The data link layer is generally divided into two sublayers, including a media access control (MAC) sublayer that controls how a computer on the network gains access to the data and permission to transmit it, as well as a logical link control (LLC) sublayer that controls frame synchronization, flow control and error checking. The physical layer conveys the data as a bit stream of electrical impulses, light signals, and/or radio signals through the network at the physical (e.g., electrical and mechanical) level. The physical layer implements Ethernet, RS232, asynchronous transfer mode (ATM), or other protocols with physical layer components, where Ethernet is a popular local area network (LAN) defined by IEEE 802.3.

One or more layers in a network protocol stack often provide tools for error detection, including checksumming, wherein the transmitted messages include a numerical checksum value typically computed according to the number of set bits in the message. The receiving network node verifies the checksum value by computing a checksum using the same algorithm as the sender, and comparing the result with the checksum data in the received message. If the values are different, the receiver can assume that an error has occurred during transmission across the network. In one example, the TCP and IP layers (e.g., layers 4 and 3, respectively) typically employ checksums for error detection in a network application.

Data may also be divided or segmented at one or more of the layers in a network protocol stack. For example, the TCP protocol provides for division of data received from the application layer into segments, where a header is attached to each segment. Segment headers contain sender and recipient ports, segment ordering information, and a checksum. Segmentation is employed, for example, where a lower layer restricts data messages to a size smaller than a message from an upper layer. In one example, a TCP frame may be as large as 64 kbytes, whereas an Ethernet network may only allow frames of a much smaller size at the physical layer. In this case, the TCP layer may segment a large TCP frame into smaller segmented frames to accommodate the size restrictions of the Ethernet.

One or more of the network protocol layers may employ security mechanisms such as encryption and authentication to prevent unauthorized systems or users from reading the data, and/or to ensure that the data is from an expected source, as well as decryption to allow the intended authorized systems or users to read the data. For instance, IP security (Ipsec) standards have been adopted for the IP layer (e.g., layer 3 of the OSI model) to facilitate secure exchange of data, which has been widely used to implement virtual private networks (VPNs). IPsec supports various security processing cryptosystems such as DES (Data Encryption Standard), its successor AES (Advanced Encryption Standard) and an improved form of DES defined as 3DES or Triple DES. DES and 3DES can encrypt and decrypt data or a message using a single secret key. In the receiver system, the message is decrypted at the IP layer, wherein the sender and receiver systems share a public key through a security association (SA). Key sharing is typically accomplished via an Internet security association and key management protocol (ISAKMP) that allows the receiver to obtain a public key and authenticate the sender using digital certificates.

In conventional networks, the tasks of the upper and intermediate layers are performed in the host system software. Such conventional systems, however, require the host software to implement many if not all of the layer 3 and layer 4 (e.g., IP and TCP/UDP) functions, including frame creation, segmentation and reassembly, checksumming, and security processing. These functions are typically computation intensive, requiring a significant amount of host processing overhead, device real estate, power consumption, and significant processing time. Thus, there is a need for improved network systems and methods for reducing the processing load on networked host systems while reducing the real estate, power, and processing time of such a system.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later. The invention relates to security processing circuits of a host system and methods for performing 3DES encryption and decryption services for the host system using a single DES engine.

In one aspect of the invention, the 3DES security processing circuit (e.g., 3DES IPsec circuit) comprises a single DES engine, an input data message input as a 64 bit block of data, a set of keys input as 48 bit blocks of data to a data register coupled to the single DES engine, a data output, and an intermediate result feedback coupled (e.g., looped back) to an input node of the single DES engine. The single DES engine is adapted to selectively process input data from the data input message during a first DES processing operation, and subsequently to process the intermediate result data from the data output during a second and third DES processing operation. The result of the three single DES security processing operations is latched to an output register of the circuit to obtain an encrypted or decrypted 3DES data output result, based on the application of the set of encryption or decryption security keys, respectively.

In another aspect of the invention, the 3DES IPsec circuit comprises a select switch (e.g., Mux) coupled to the data input of the security processing circuit, the data output, and the input node of the single DES engine. The select switch is adapted to select and couple one of the data input message and the intermediate result to the input node of the single DES engine.

In yet another aspect of the invention, the 3DES security processing circuit (3DES IPsec circuit) is provided as a circuit element of a network interface device, comprising a bus interface to transfer data between the network interface device and a host system and a media access control system to transfer data between the network interface device and the network. The network interface device also receives incoming data and transmits outgoing data being transferred between the network and the host system. The 3DES IPsec circuit selectively encrypts outgoing data and selectively decrypts incoming data between the network and the host system. In addition to the security processing functions of the 3DES IPsec circuit, the network interface device may provide functions such as frame creation, segmentation and reassembly, and checksumming. In one implementation, the security processing circuit encrypts information from the host corresponding to an outgoing data frame from the host system. The bus interface, media access control, and security processing circuit may be included within a single integrated circuit in one example.

In one implementation of the present invention, the 3DES IPsec circuit may also operate in one of a variety of modes including, for example, an electronic code book (ECB) mode, or a cyclic block chaining (CBC) mode, each of which is commonly used with conventional DES/3DES cryptographic processing.

In another aspect of the invention, the 3DES IPsec circuit comprises a discrete device residing and interfacing external to an associated network interface device between the network and the host system.

In one implementation, the 3DES IPsec circuit comprises a key select switch and key register adapted to selectively couple one or more blocks of a set of key blocks to the single DES engine of the circuit, wherein the selected key may be used to encrypt or decrypt data between the network and the host system in accordance with 3DES security processing.

In another aspect of the invention, a method is provided for 3DES security processing using a security processing circuit employing a single DES engine. The exemplary method operates symmetrically whether encrypting incoming data or decrypting outgoing data, or whether the 3DES IPsec circuit resides external or internal to an associated interface device between the network and the host system. The method comprises latching an input message data block and first key data block from the network interface device using an input and key select switches (e.g., multiplexors), respectively, selecting and coupling the data to the single DES engine. First DES processing the data to obtain a first intermediate result at a DataOut bus feedback to the single DES engine. Subsequently, in a second and third DES processing operation, the first and second intermediate result data is selected and coupled along with the second and third key data to the single DES engine to obtain a second and third result at a DataOut bus of the single DES engine. The third result from the third DES processing operation is latched at the DataOut bus. The method may further comprise transferring the third result data from the security processing circuit to the network interface device.

In addition, security processing (e.g., encryption, decryption, authentication, etc.) may be selectively performed on the incoming or outgoing data treated as input data to the 3DES IPsec circuit. The final result output data is then transferred from the 3DES IPsec circuit to the network interface device, which then determines whether the data is incoming data decrypted for use in the host system or outgoing data encrypted for the network.

To the accomplishment of the foregoing and related ends, the following description and annexed drawings set forth in detail certain illustrative aspects and implementations of the invention. These are indicative of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1K is a spread sheet illustrating a comparison of the path timings between the exemplary 3DES Ipsec circuits of FIGS. 1H and 1I;

DETAILED DESCRIPTION OF THE INVENTION

As previously introduced, encryption is the transformation of data to a form which is very difficult to read without the appropriate knowledge or key. There are different approaches to cryptography like public/secret key encryption, and different algorithms are used for each type of system. DES and its successor 3DES are cryptosystems which can encrypt and decrypt data using a single secret key.

DES is an acronym for Data Encryption Standard, originally developed by IBM in the early 1970s as Lucifer, then modified and renamed DES by the NSA and NIST. DES was adopted as a federal standard in 1976. However, as computers have become more powerful, simple DES has become more vulnerable to security breaches, so NIST defined 3DES or Triple DES in 1999 to replace DES. 3DES uses three stages of DES so it is much more secure and suffices for most applications currently.

DES is a block cipher; that is, DES acts on a fixed-length block of plaintext data and converts it into a block of ciphertext data of the same size by using the secret key. In DES, the block size for plaintext is 64 bits. The length of the key is also 64 bits, but 8 bits are used for parity. Hence the effective key length is only 56 bits. In 3DES, 3 stages of DES are applied with a separate key for each stage, so the key length in 3DES is 168 bits (3×56 bits).

Figure 1A:
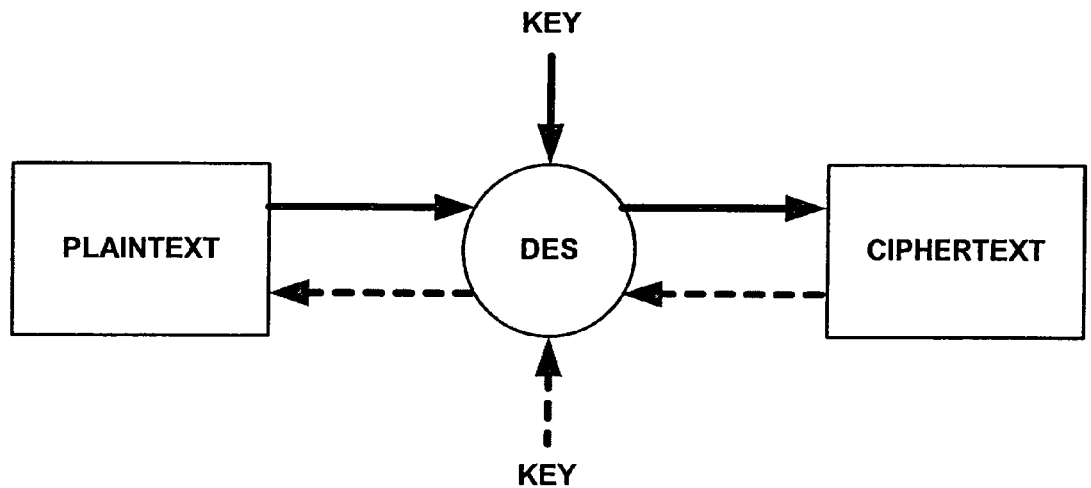
FIG. 1A is a block diagram of a conventional DES engine illustrating symmetric key cipher operations for encryption and decryption processing.

DES decryption is accomplished by applying the reverse transformation to the block of ciphertext using the same key. Since the same key is used both in encryption and decryption, DES is called a symmetric key cipher. This method differs from algorithms like RSA encryption that use different keys to encrypt and decrypt a message. FIG. 1A illustrates this symmetric property of the DES method of operation 1. In other words (flowing from left to right), a plaintext block of data (message) is encrypted using DES and a secret cipher key to produce a ciphertext block of data. Symmetrically (flowing from right to left), the ciphertext block of data may be decrypted using DES and the same secret cipher key to reproduce the original plaintext block of data.

Figure 1B:
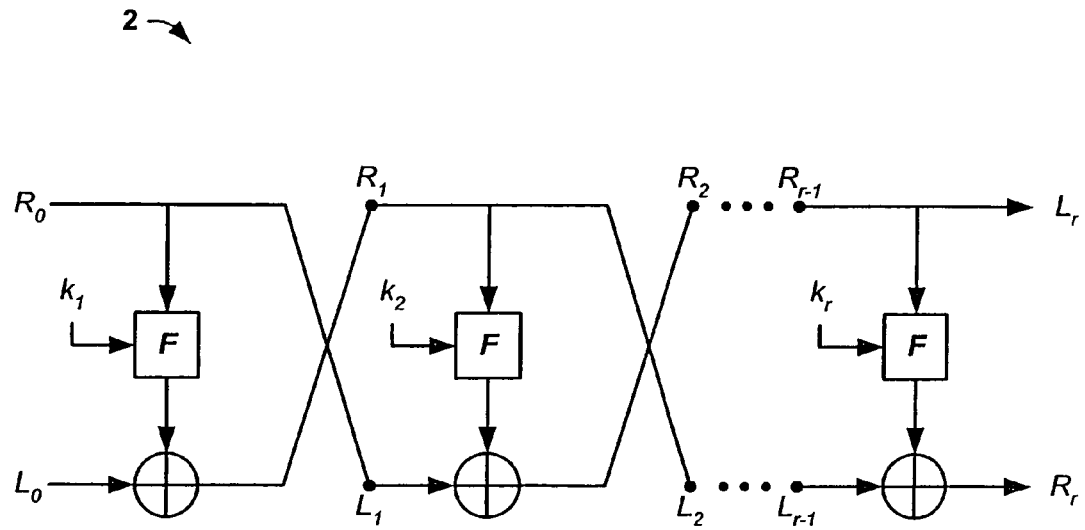
FIG. 1B is a process diagram illustrating several rounds of the basic DES algorithm using the Feistel Cipher.

FIG. 1B illustrates a basic DES algorithm 2, which encrypts a plaintext block by a process that has 16 rounds (or steps). In the encryption process, the block of plaintext is split into two halves ($L_0, R_0$), each of which is 32 bits long and comprises 8 steps or rounds of processing. Also, DES uses the original 56 bit key to generate 16 keys of 48 bits each ($k_i$). These subkeys are used in the 16 rounds.

In each round, the function F is applied to one half the data using a subkey $k_i$ and the result is XORed with the other data half. The two halves are then swapped and the process is repeated. All the rounds follow the same pattern except the last one, where there is no swap. The final result is the ciphertext ($L_r, R_r$). Hence the plaintext ($L_0, R_0$) is transformed to ($L_r, R_r$).

Decryption is structurally identical to encryption. Thus, the same machinery may be used as described above. However, the input with decryption is the pair ($R_r, L_r$) rather than ($L_0, R_0$). Further, the input subkeys are applied in the reverse order, so the ith subkey is $k_{r-i+1}$ rather than $k_i$. The final result is the original text ($L_0, R_0$), so the ciphertext ($R_r, L_r$) is decrypted to ($L_0, R_0$).

In the 3DES algorithm, the same basic DES machinery as described above may be used three times over using 3 keys $k_1$, $k_2$, $k_3$. The plaintext (M) is encrypted using $k_1$. This result is encrypted with $k_2$, and the result is then encrypted with $k_3$ to obtain a ciphertext (C).

$$C = E_{k3}(E_{k2}(E_{k1}(M))).$$

This mode of using 3DES is called the DES-EEE mode since all three keys run in the encryption mode. The other mode is called DES-EDE where the second stage is run in decryption mode. i.e.

$$C = E_{k3}(D_{k2}(E_{k1}(M))).$$

The 3 keys $k_1$, $k_2$, $k_3$ may or may not be independent. For the DES-EDE mode, three options are defined.

1) The keys $k_1$, $k_2$, and $k_3$ are independent.
2) $k_1$ and $k_2$ are independent but $k_1 = k_3$.
3) $k_1 = k_2 = k_3$—In this case, 3DES becomes backward compatible with DES.

Modes of Operation for DES/3DES

While encrypting or decrypting large data files, for example, different strategies are used to either speed up the process or mask patterns in the data. The main modes of operation of DES are: Electronic Code Book (ECB), and Cyclic Block Chaining (CBC).

Figure 1C:
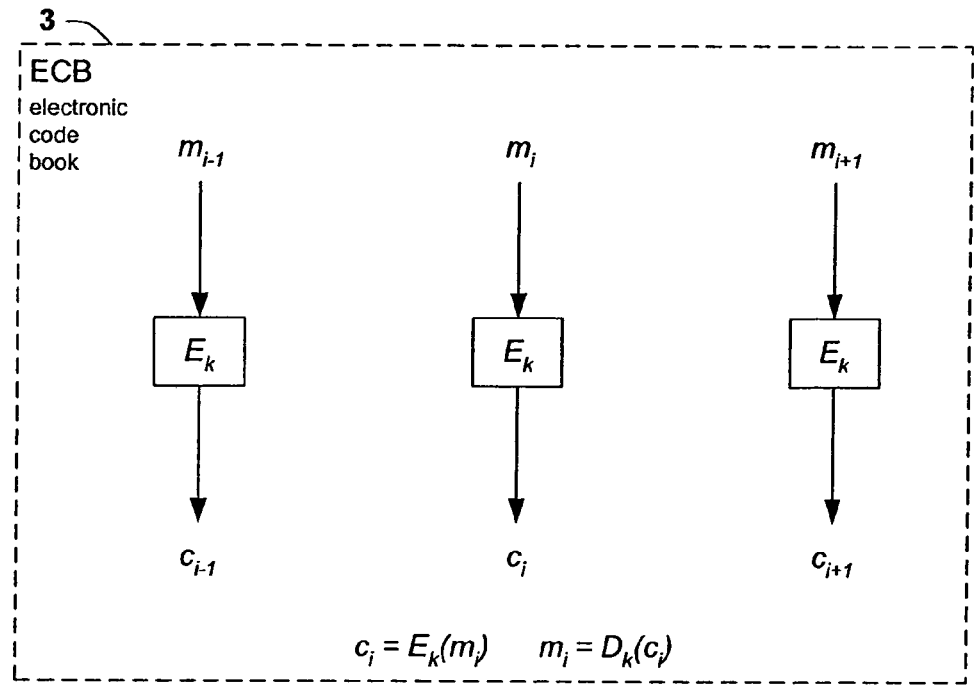
FIGS. 1C and 1D are process diagrams illustrating two modes of operation for DES/3DES IPsec processing.

FIG. 1C illustrates the ECB mode of operation 3. In ECB, each block is encrypted independently. Hence, it is very easy to parallelize the process. However, plaintext patterns are not concealed since identical blocks of plaintext give identical blocks of ciphertext.

Figure 1D:
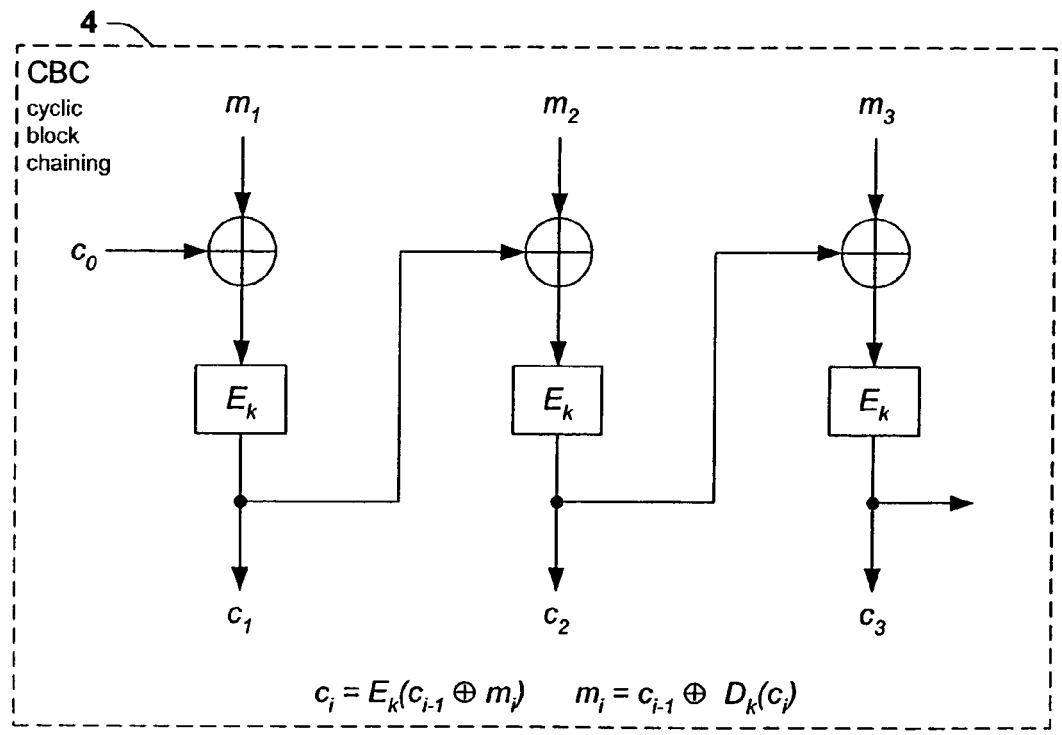

FIG. 1D illustrates the CBC mode of operation 4. In CBC, the plaintext block is XORed with the previous ciphertext block and then encrypted. This mode conceals any patterns in the plaintext because of the XOR operation with the previous ciphertext block. Although, it is difficult to parallelize this process, CBC is the most common and most secure mode of using DES/3DES.

The other main modes of DES/3DES operation are CFB (Cipher Feedback Mode) and OFB (Output Feedback Mode). Both of these modes make use of XOR operations and feedback. CFB and OFB allow use of feedback that is less than one full data block, but this is not usually recommended.

In a conventional security processing system, the three stages of 3DES and particularly 3DES-CBC, may be accomplished using three discrete DES engines. By contrast, the 3DES IPsec circuit of the present invention provides 3DES/3DES-ECB/3DES-CBC processing using a single DES engine to obtain an intermediate result that is looped back to the input of the engine for second and third DES processing operations. Thus the present invention accomplishes more security processing with less hardware, semiconductor real estate, and correspondingly less power consumption, while maintaining gigabit/s (Gb/s) processing speeds.

One or more implementations of the present invention will now be described with reference to the drawings, wherein like reference numerals are used to refer to like elements throughout.

Referring initially to FIGS. 1E-1K, illustrates an exemplary 3DES security processing circuit (3DES IPsec circuit) 5, provided as a circuit element of a network interface device 6. The 3DES IPsec circuit 5, comprises a single DES engine 5a, a message input data 5b as a 64 bit block of data, a set of security keys data 5c input as 48 bit blocks of data to the single DES engine 5a, a data output 5d, and an intermediate result 5e feedback coupled (looped back) to an input node of the single DES engine 5a. The single DES engine 5a is adapted to selectively process input data from the message input data 5b during a first DES processing operation, and subsequently to process the intermediate result data 5e during a second and third DES processing operation. The result of the three single DES security processing operations is latched to an output register of the circuit to obtain an encrypted or decrypted 3DES data output result based on whether a set of encryption or decryption security keys, respectively, is applied to the keys data 5c.

As a circuit element of a network interface device 6, the 3DES IPsec circuit 5 comprises a bus interface 9 to transfer data between the network interface device 6 and a host system 7 and a media access control system 10 to transfer data between the network interface device 6 and the network 8. The network interface device 6 also receives incoming data and transmits outgoing data being transferred between the network 8 and the host system 7. The 3DES IPsec circuit 5 selectively encrypts outgoing data and selectively decrypts incoming data between the network 8 and the host system 7.

In addition to the security processing functions of the 3DES IPsec circuit 5, the network interface device 6 may provide functions such as frame creation, segmentation and reassembly, and checksumming. In one implementation, the security processing circuit 5 encrypts plaintext information from the host 7 corresponding to an outgoing data frame from the host system 7. The bus interface 9, media access control 10, and security processing circuit 5 may be included within a single integrated circuit in one example.

The network interface device 6 comprises a bus interface 9 which can be operatively coupled with the host system 7, such as via a bus in the host system, where the bus interface 9 is adapted to transfer data between the network interface device 6 and the host system 7. A media access control (MAC) system 10 in the network interface device 6 may be operatively coupled with the network 8, such as via a media independent interface (e.g., MII, GMII, etc.) compliant transceiver (not shown), wherein the MAC system 10 is operable to transfer data between the network interface device 6 and the network 8.

The 3DES IPsec circuit 5 may be constructed using any electrical circuitry or components configured or configurable to perform the 3DES security processing utilizing a single DES engine. In particular, 3DES IPsec circuit 5 may comprise any combination of hardware such as logic devices, analog circuits, electrical connectors, etc., which may be programmable or configurable by software and/or firmware within, as a circuit element of, or as a separate component in communication with the network interface device 6.

The 3DES IPsec circuit 5 is configured or configurable to selectively perform security processing for incoming and/or outgoing data in the network interface device 6. The 3DES IPsec circuit 5, may be constructed using any suitable electronic devices, such as analog and logic circuitry, configured or configurable to perform security processing for incoming and/or outgoing data in the interface device 6. In one implementation, the 3DES IPsec circuit 5 is an IPsec system adapted to selectively provide encryption and decryption functions for incoming and outgoing data, as illustrated and described further below. However, other forms of security systems and other types of security processing are contemplated within the scope of the invention.

Figure 1E:
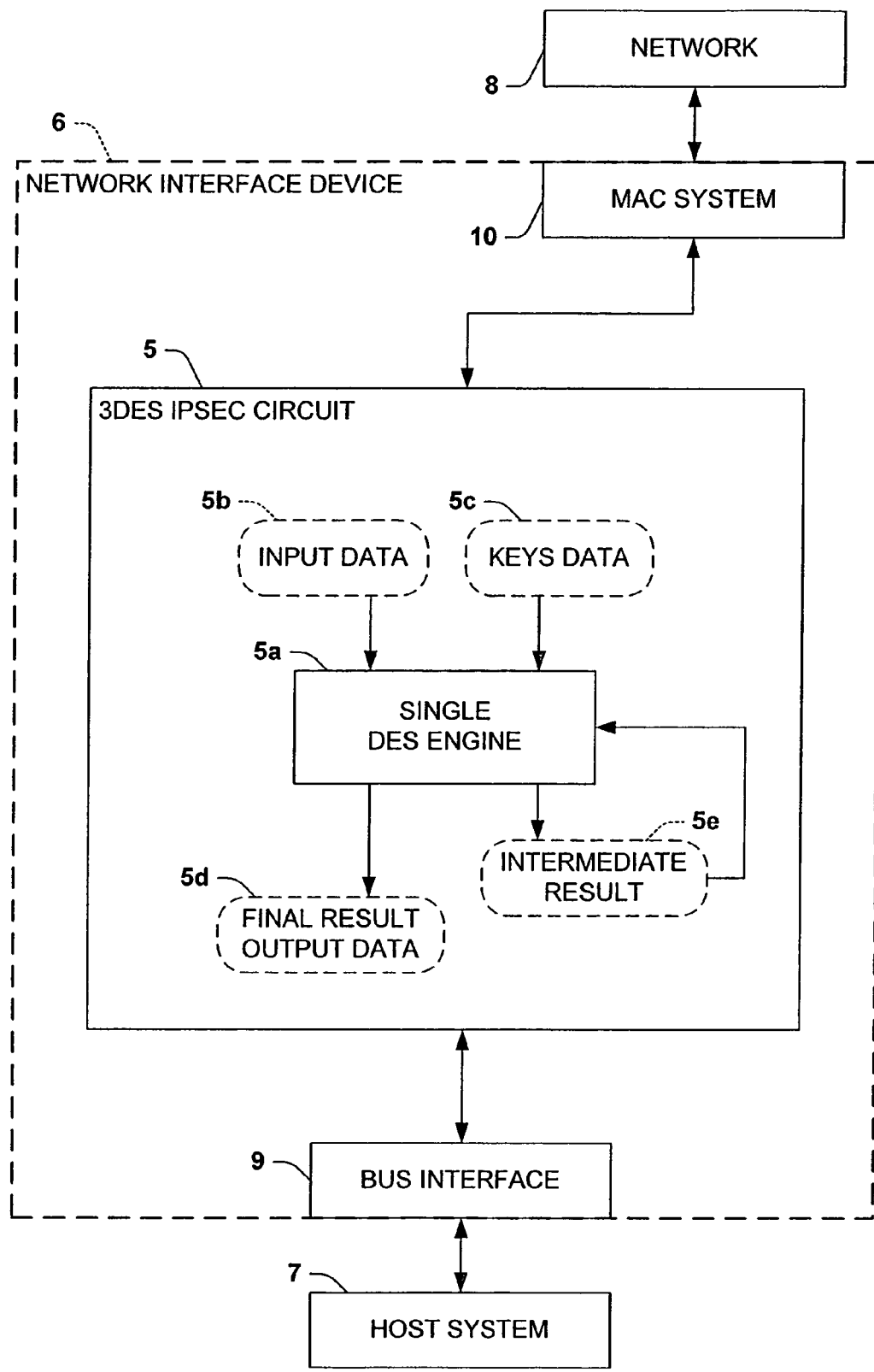
FIG. 1E is a block diagram illustrating an exemplary 3DES IPsec circuit used within a network interface device in accordance with one or more aspects of the present invention.
Figure 1F:
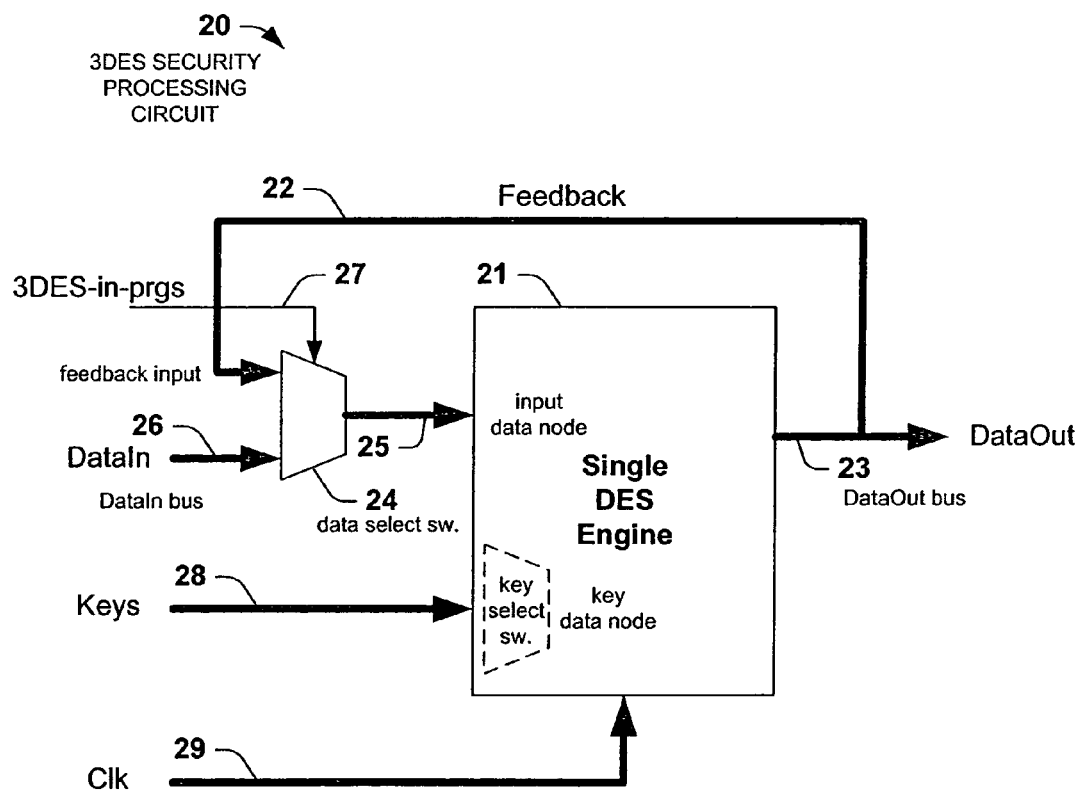
FIG. 1F is a block diagram illustrating an exemplary 3DES IPsec circuit in accordance with one or more aspects of the present invention.

FIG. 1F, for example, illustrates an exemplary 3DES IPsec circuit 20 comprising a single DES engine 21 having a feedback path 22 coupling a DataOut bus 23 of the 3DES circuit 20 to a data select switch 24 (e.g., a Mux) that is also coupled to an input data node 25 of the single DES engine 21 in accordance with an aspect of the invention. A data message is input (e.g., 64 bit block of data), arriving on a DataIn bus 26, and is selected for connection to the input data node 25 by asserting a 3DES-in-prgs signal 27 to the data select switch 24. The 3DES IPsec circuit 20 further comprises a set of keys 28 (e.g., three 48 bit blocks of data) input, for example, via another key select switch, a keys register, and a data register (e.g., either internal or external to the single DES engine), associated with the single DES engine 21. The set of keys comprises three different keys, for example, a first, second and third key associated with a first, second and third DES processing operation, respectively, of the 3DES process.

Timing of the 3DES IPsec circuit 20 may be controlled by the application of a system clock signal Clk 29. The data output, DataOut 23 of the single DES engine 21 is looped back via feedback loop 22 to the same engine 21 for the second and third DES processing operations of the 3DES process. For example, at each of the first, second and third DES processing loops, a different key from the set of keys 28, is selected for coupling to the single DES engine 21, by asserting a keys selection signal to the key select switch.

The single DES engine 21 is adapted to selectively process input data from the DataIn 26 message during the first DES processing operation, and subsequently to process an intermediate result data from the data output DataOut bus 23 during the second and third DES processing operations using the data select switch 24. For example, during the first DES processing, the data select switch 24 selectively couples the input data message block on the DataIn bus 26 to the input node 25 of the single DES engine, by deasserting the 3DES-in-prgs signal 27. Subsequently, during the second and third DES processing operations, the intermediate result is coupled to the input node 25 of the single DES engine, by asserting the 3DES-in-prgs signal 27 to the data select switch 24. Following the second and third single DES security processing operations, the final result may be latched to an output register of the circuit to obtain an encrypted or decrypted 3DES data output result at DataOut bus 23, based on the application of a set of encryption or decryption security keys, respectively, at keys 28 selected for coupling to the single DES engine 21 by asserting the keys selection signal to the key select switch.

In accordance with the present invention, it is desirable to perform the 3DES operation at gigabit/s processing speeds (Gb/s), or 1 bit/ns. Since a triple DES engine processes a 64 bit block of data at one time, the gigabit processing would need to process the 64 bit block in 64 ns.

1 Gb/s=1 bit/ns.=64 bits/64 ns.

In the present application, it is also desirable to minimize gate count yet meet the gigabit/s processing data rate performance. Thus the single DES engine of the present invention would need to complete the full 3DES process in the 64 ns. The internal clock 29 applied to the engine 21 controls the cycles and speed of the process. As it is also desirable to minimize power consumption in such circuitry, and a high internal clock rate typically consumes more power, the lowest clock speed is selected in the present invention, which will accomplish the gigabit/s processing rate. For example, if a clock period of 8 ns (125 MHz) were chosen, there will be a timing budget of:

Total cycle time budget/time for a clock cycle=64 ns/8 ns=8 clock cycles.

Thus, the exemplary maximum allowable timing budgets 8 clock cycles for the full 3DES processing. In one implementation, the following must take place in those 8 clk cycles:

a) 1 clock cycle of overhead for latching input data.
b) 6 clock cycles for the 3DES processing.
c) 1 clock cycle of overhead for latching output data.

Allowing 6 clock cycles for the 3DES processing, leaves 2 clock cycles for each of the three single DES processes. As the DES algorithm comprises 16 steps or rounds of block cipher processing divided into two halves of 8 steps or rounds each, a further gate count reduction may be made by having each half (e.g., left and right half of the 64 bit block) of 8 steps completed in one clock cycle for 8 steps per clock cycle. A loop back within the single DES engine could be used to perform the next 8 steps of the second half in the second clock cycle. Effectively, the full 3DES processing would then be completed within the budgeted 6 clock cycles using a single DES engine, such as the single DES engine 21 used in the 3DES IPsec circuit 20 of FIG. 1F.

Figure 1G:
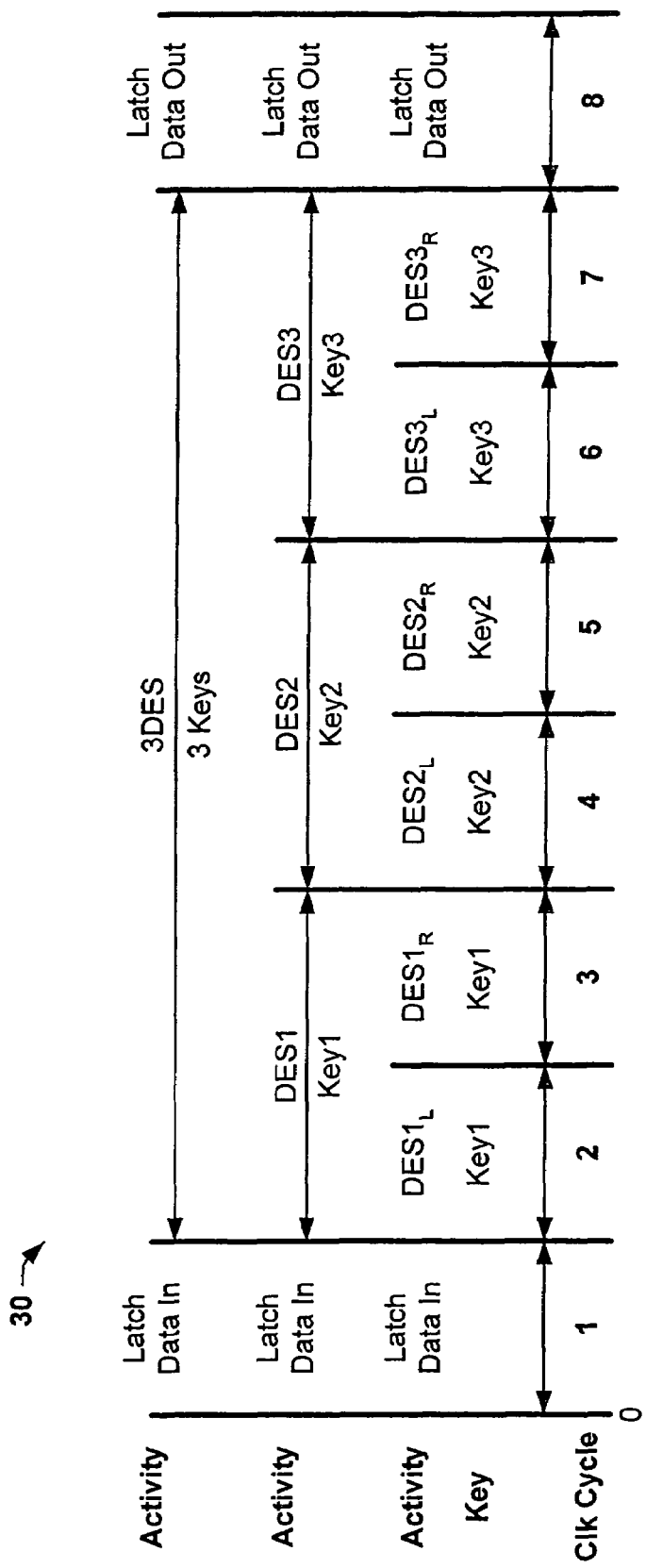
FIG. 1G is a timing diagram illustrating an exemplary 3DES IPsec processing sequence in accordance with the invention and FIGS. 1E and 1F.

FIG. 1G illustrates a timing diagram of an exemplary 3DES IPsec processing sequence 30 in accordance with the invention and FIGS. 1E and 1F. As explained above, and as illustrated in the top row of the timing, clock cycle 1 may be used to latch input data (e.g., DataIn 26 of FIG. 1F) into the 3DES IPsec circuit 20. Clock cycles 2-7 perform the 3DES processing using the three secret keys (e.g., Keys 28 of FIG. 1F). Finally, in clock cycle 8 the result of the processing is latched as output data (e.g., DataOut 23 of FIG. 1F). In the second row of the timing diagram, the 3DES process is broken down into the three single DES processes (e.g., DES1, DES2, and DES3), using the three separate keys (e.g., Key1, Key2, and Key3) used to either encrypt or decrypt the input data based on the selection of the keys asserted to the 3DES IPsec circuit 20. Lastly, in the third row, each single DES processing stage is broken down further into the left and right half of the 64 bit data blocks, comprising 32 bits each (e.g., DES2L and DES2R) in 8 rounds (steps) each, using the same key (e.g., Key2) for each half.

Operationally then, a block of data is initially input as a data message to DataIn 26 to the 3DES IPsec circuit 20 during clock cycle 1. Data select switch 24 (e.g., a Mux) initially selects the input data block at DataIn 26, by deasserting the 3DES-in-prgs signal 27 to the data select switch 24, thereby coupling the data to input data node 25 of the single DES engine 21. By the end of clock cycle 1, the input data message is latched into the single DES engine 21, for example, using a data register synchronized by clock input 29.

At the beginning of clock cycle 2, a security key (e.g., Key1) associated with a first DES process (e.g., DES1), is selected from the set of security keys 28, for example, using an internal or external key select switch asserting a key selection signal to couple Key1 to the single DES engine 21. During clock cycles 2 and 3, the DES1 process proceeds, DES1 comprising 16 rounds of security processing on the input data in two data halves, for example, feedback looped 22 thru a set of 8 cipher blocks within the single DES engine 21. Upon completion of clock cycle 3, a first intermediate result of the first DES process DES1, is generated at DataOut bus 23 feedback coupled 22 to data select switch 24. By the end of clock cycle 3, 3DES-in-prgs is asserted to data select switch 24, thereby coupling the first intermediate result of the DES1 processing back into the input data node of the single DES engine 21, and latching the first intermediate result, for example, in a data register.

During clock cycles 4 and 5, a second security process DES2 proceeds as before with DES1, except that DES2, begins with the first intermediate result of DES1 as the input data and a different security key Key2 associated with DES2. Key2 is selected, for example, by asserting the key selection signal to the key selection switch. Upon completion of clock cycle 5, a second intermediate result of DES2 is generated at DataOut bus 23 feedback coupled 22 for input connection by data select switch 24 asserted by 3DES-in-prgs signal 27.

During clock cycles 6 and 7, a third security process DES3 proceeds as before with DES2, except that DES3, begins with the second intermediate result of DES2 as the input data and a different security key Key3 associated with DES3. Upon completion of clock cycle 7, a final result of DES3 is generated at DataOut bus 23 for output from the 3DES engine 20. During clock cycle 8 the final result of DES3 may be further processed and latched, for example, using a data output register.

Figure 1H:
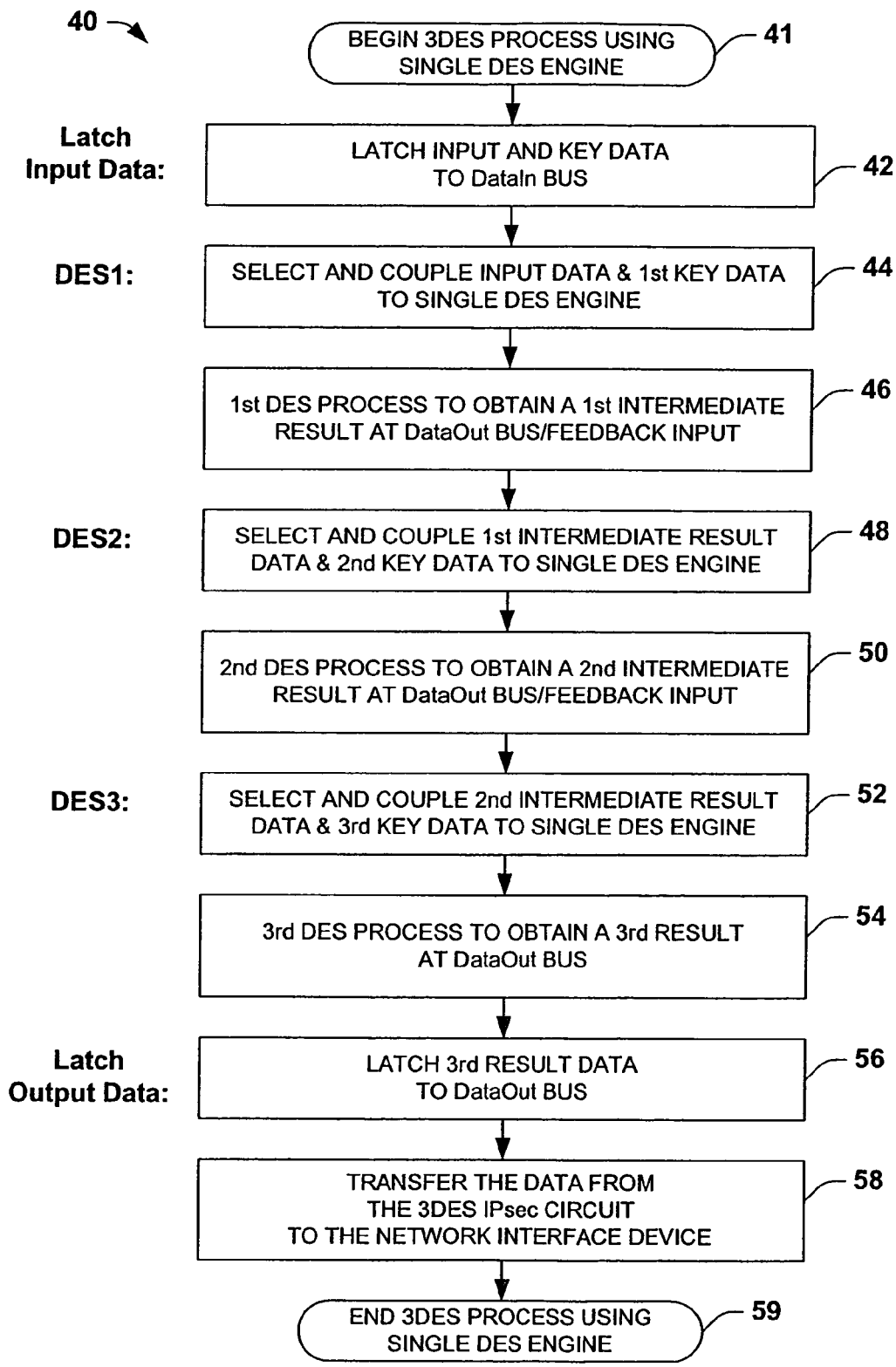
FIG. 1H is a flow diagram illustrating exemplary 3DES encryption or decryption processing in accordance with the invention.

FIG. 1H illustrates an exemplary 3DES processing methodology using a single DES engine method flow 40 in accordance with another aspect of the invention, which may be implemented in the exemplary 3DES IPsec circuit 20 or other systems. Although the exemplary method 40 and other methods are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of the network interface devices, which are illustrated and described herein as well as in association with other systems and devices not illustrated.

Beginning at 41, the method 40 comprises initially latching input and key data blocks at 42 input from an associated input data buss. In one example, the 3DES IPsec circuit 20 in FIG. 1F obtains input and key data block information from the DataIn bus 26 message data and from the Keys 28 secret keys data blocks, respectively. In another example, the 3DES IPsec circuit 20 in FIG. 1F is a component within the network interface device 6, and obtains input and key data block information associated with incoming data to be decrypted from the network 8 or outgoing data to be encrypted from the host system 7 via the bus interface 9 or the MAC system 10, respectively. The input and a first key data (e.g., input data 5b and 26, and keys data 5c and 28 of FIGS. 1E and 1F, respectively) is then selected and coupled at 44 (e.g., using the data select switch 24, and a key select switch) into the single DES engine 5a and 21. At 46, a first DES process obtains a first Intermediate result (e.g., intermediate result 5e) at an output data bus (e.g., DataOut bus 23) is looped back (e.g., feedback line 22) to the single DES engine (e.g., single DES engine 5a and 21 via data select switch 24 to the input node 25 by asserting the 3DES-in-prgs signal 27).

The first intermediate result and a second key (e.g., intermediate result 5e, feedback 22, and a second key) is then selected and coupled at 48 (e.g., using the data select switch 24 selected using 3DES-in-prgs signal 27, and a key select switch) into the single DES engine 5a and 21. At 50, a second DES process obtains a second intermediate result (e.g., intermediate result 5e) at the output data bus DataOut bus 23 and is looped back to the single DES engine (e.g., single DES engine 5a and 21).

The second intermediate result and a third key (e.g., intermediate result 5e, feedback 22, and a second key) is then selected and coupled at 52 (e.g., using the data select switch 24 selected by asserting the 3DES-in-prgs signal 27, and the key select switch) into the single DES engine (e.g., single DES engine 5a and 21). At 54, a third DES process obtains a third result (e.g., final result output data 5d), which is made available to the output data bus DataOut bus 23 of the single DES engine (e.g., single DES engine 5a and 21).

Finally, at 56 the third result data is latched into the output data bus DataOut bus 23 as a 3DES result data (e.g., encryption or decryption result) in accordance with the present invention. Thereafter at 58, optionally, the 3DES data may be selectively transferred from the 3DES IPsec circuit 5 or 20 to the network interface device 6 for use in the network 8 or host 7 via bus interfaces 10 and 9, respectively, based on the selection of the input and keys data supplied the 3DES IPsec circuit 5 or 20, before the method 50 ends at 59.

Attempting to implement such a 3DES processing circuit on chip employing only a single DES engine to accomplish the Gb/s speeds is not a simple task. This difficulty is particularly true when each single DES processing operation must be accomplished within only two clock cycles as discussed earlier in association with the timing diagram of FIG. 1G. The following figures and descriptions will illustrate these difficulties and highlight one or more successful solutions in accordance with the present invention.

Figure 1I:
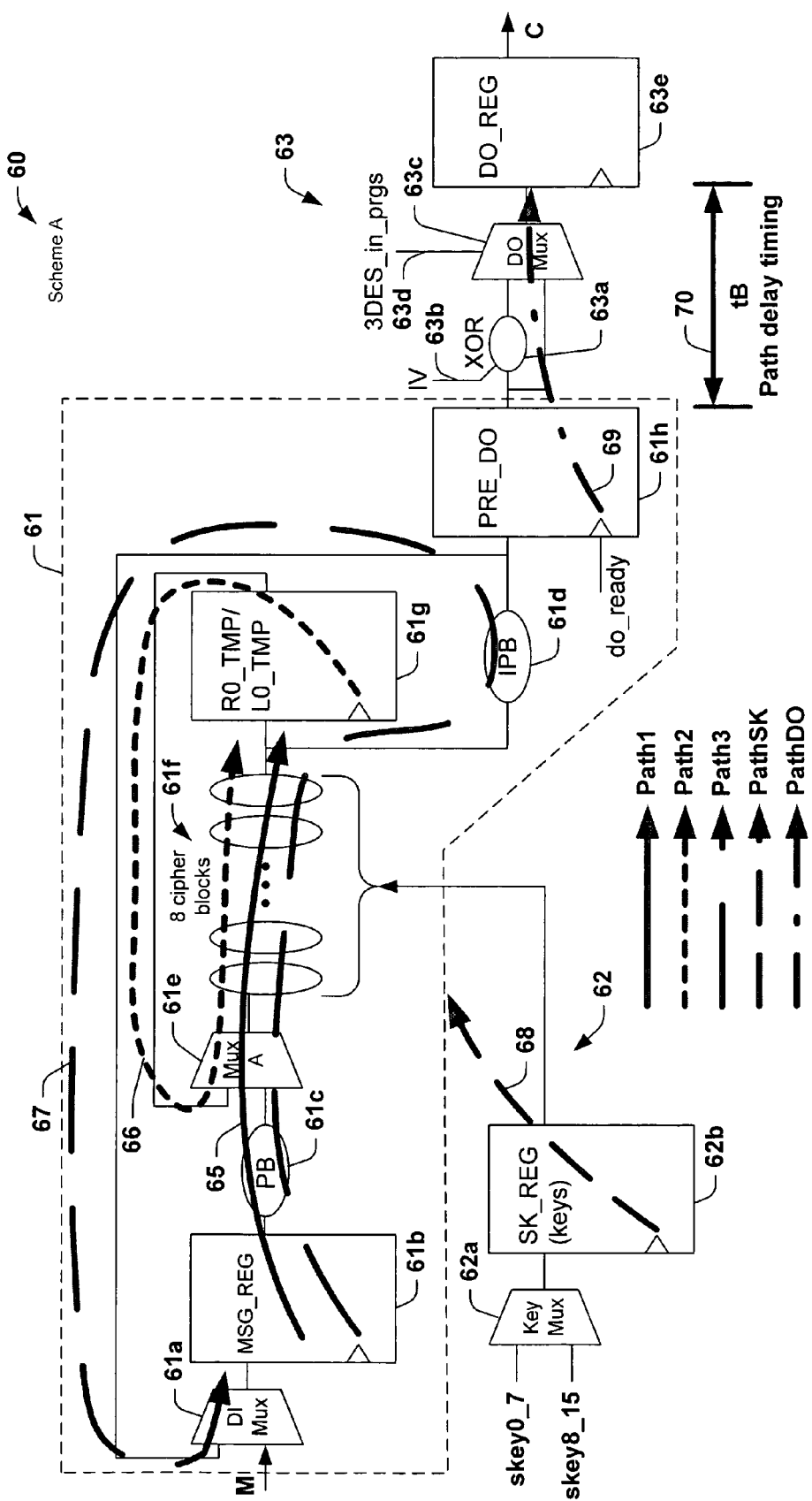
FIG. 1I is a circuit diagram illustrating an exemplary 3DES Ipsec circuit using a single DES engine for security processing in accordance with an aspect of the invention.
Figure 1J:
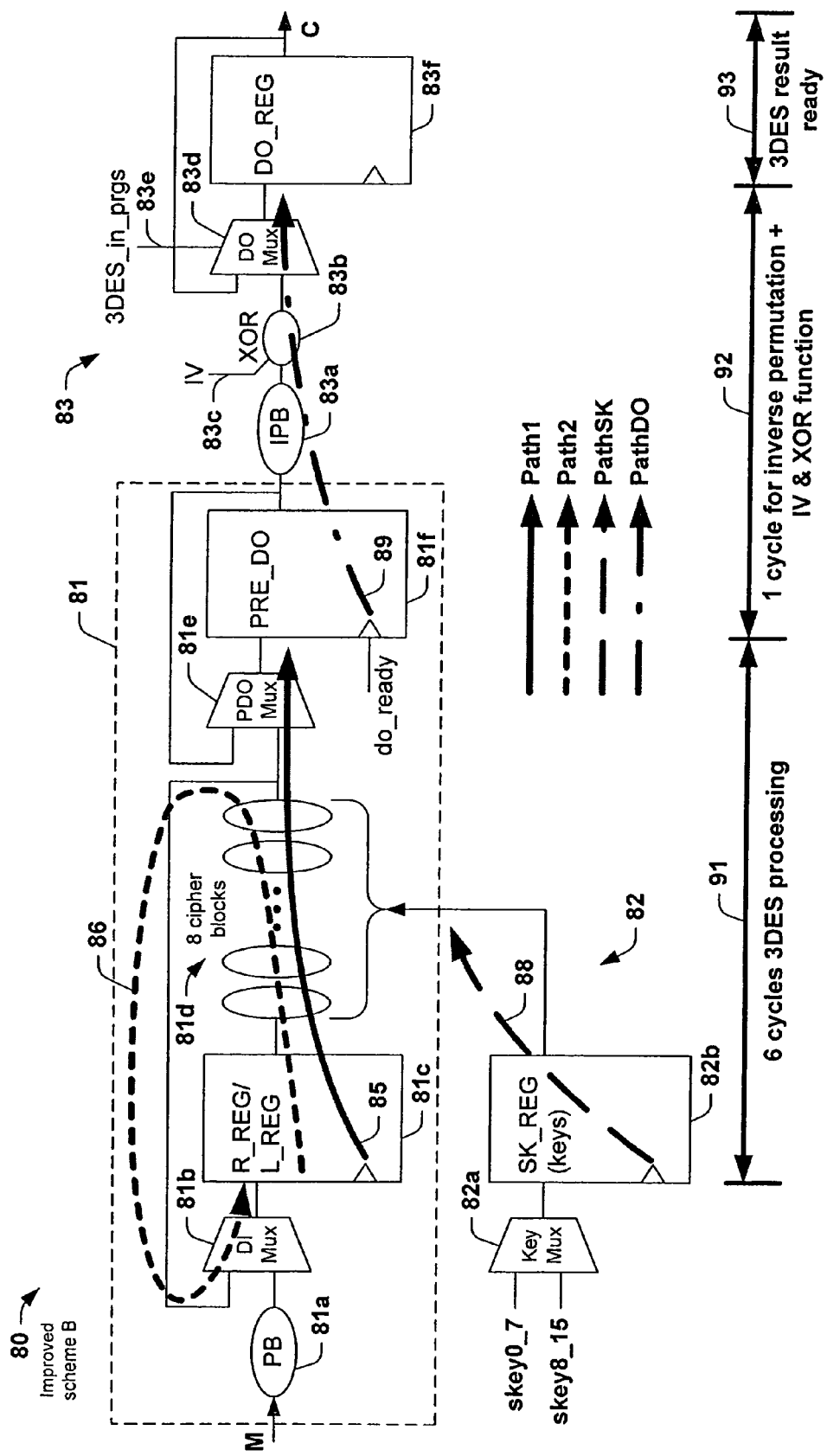
FIG. 1J is a circuit diagram illustrating another exemplary 3DES Ipsec circuit using a single DES engine for security processing in accordance with an aspect of the invention, the 3DES circuit having improved timing capable of gigabit/sec processing.

FIGS. 1I and 1J illustrate two exemplary implementations of a 3DES processing circuit similar to that of FIGS. 1E and 1F, using a single DES engine in accordance with an aspect of the invention or other such circuits and devices. The exemplary 3DES IPsec circuits 60 and 80 use different circuit arrangements which result in two different timing schemes, referred to herein as scheme A and scheme B, respectively. Scheme B of FIG. 1J will demonstrate a significant critical timing path improvement over Scheme A of FIG. 1I. The timing paths will also be contrasted in the spreadsheet comparison of FIG. 1K.

FIG. 1I, for example, illustrates an exemplary 3DES IPsec circuit 60 and timing scheme A using a single DES engine for security processing in accordance with an aspect of the invention. 3DES IPsec circuit 60, for example, comprises a single DES engine 61, a keys input section 62, and a data output section 63. The single DES engine 61, comprises a data input multiplexor DI Mux 61a for selectively coupling either an input message M or a feedback input to a message register MSG_REG 61b. The single DES engine 61 also comprises a permutation block PB 61c, an inverse permutation block IPB 61d, a multiplexor Mux A 61e, a set of 8 cipher blocks 61f, a pair of temporary holding registers R0_TMP/L0_TMP 61g, and a preliminary data output register PRE_DO 61h.

The keys input section 62, comprises a keys input multiplexor, key Mux 62a for selectively coupling one of the set of security keys (e.g., $skey_{0-7}$, $skey_{8-15}$) to a key register SK_REG 62b used to assert the selected key to the 8 cipher blocks 61f.

The data output section 63, comprises an XOR 63a for logically combining an initialization vector IV 63b with the data output of PRE_DO 61h. Data output section 63, further comprises a data output multiplexor DO Mux 63c for selectively coupling either the data output of PRE_DO 61h or the logical output of the XOR 63a, as controlled by the state of a 3DES_in_prgs signal 63d, the output of DO Mux 63c being transferred to a data output register DO_REG 63e.

The 3DES IPsec circuit 60, in accordance with one aspect of the present invention, is operable to receive the plaintext message M, and to DES or 3DES cryptographically process the plaintext message M into a cyphertext C using the set of secret keys (e.g., $skey_{0-7}$, $skey_{8-15}$) utilizing a single DES engine 61. As previously stated, since this process is symmetric, the set of secret keys may be used to either encrypt or decrypt the data input at plaintext message M and output at cyphertext C.

The timing paths of the 3DES IPsec circuit 60 and timing scheme A using a single DES engine, will now be described including problems associated with the gate delays in a critical path (the longest timing path). The timing paths of circuit 60 comprise a Path1 65, a Path2 66, and a Path3 67 through the single DES engine 61, a PathSK 68 through the keys input section 62, and a PathDO 69 through the data output section 63. Note, the order and timing of each of the paths described herein have no bearing on the numbers used in the path labels. In fact, one or more of the paths may run concurrently, consecutively, or begin and end independently of other paths. For example, PathSK 68 may run concurrently with Path1 65 and Path2 66 to supply the keys needed during the processing of the 8 cipher blocks 61f. Each of the timing paths indicated generally begin from a clock input start point of a flip flop (indicated by the ">" symbol in the flip flop) to the path end point at the data input of the next flip flop (e.g., or the same flip flop, if the path loops back).

Referencing FIG. 1I and the spreadsheet of FIG. 1K, the single DES engine 61 of circuit 60 and timing scheme A contains three critical timing paths, Path1 65, Path 2 66, and Path3 67 (e.g., paths which include the 8 cipher blocks). In addition, there is another path (not shown), which starts at MSG_REG 61b, and ends at PRE_DO 61h, basically used as a subset of Path3 67 for latching the third DES result during 3DES processing. Operationally, for example, a 64 bit block of data is input as a plaintext message M as selected by DI Mux 61a and stored in the MSG_REG 61b in a first clock cycle (e.g., clock cycle 1) as indicated in FIG. 1G. In one example, Path1 65 comprises the first 8 steps of the DES processing, using R0_TMP/L0_TMP 61g to temporarily register the result of the processing (e.g., the left 32 bits half of the 64 bit block stored in register LO_TMP) within one clock cycle (e.g., clock cycle 2). Path2 66 comprises the second 8 steps of the DES process in the next clock cycle (e.g., clock cycle 3), using R0_TMP/L0_TMP 61g to temporarily register the result of the processing (e.g., the right 32 bits half of the 64 bit block stored in register RO_TMP). Note, for the "back-to-back" 3DES processing, this path needs to be completed within one clock cycle. The Path3 67 timing comprises the path to loop back the data from one DES process stage to the next DES stage. This path must be completed within 1 clock cycle, in time enough to latch the result of one DES processing (e.g., DES1, DES2) into the MSG_REG 61b for the next DES processing (e.g., DES2, DES3).

In paths Path1 65, the data is processed thru permutation block PB 61c, Mux A 61e, 8 cipher blocks 61f and temporarily stored in temporary holding registers R0_TMP/L0_TMP 61g being feedback coupled thru Mux A 61e for the next half of a DES processing operation. In Path2 66, the last half of the data (e.g., 32 bits of the 64 bit block) is processed thru the 8 cipher blocks 61f. Concurrently with paths Path1-2, path PathSK 68 starts at SK_REG 62b, and transfers the first secret key of the set of keys to the 8 cipher blocks 61f for the security processing (e.g., encryption or decryption). In the final timing path of the single DES engine 61, Path3 67 initially traverses the same route as Path1 65. Path3 67 starts at the clock input of message register MSG_REG 61b, processes thru permutation block PB 61c, Mux A 61e, the 8 cipher blocks 61f, inverse permutation block PB 61d that feeds PRE_DO 61h and also feedback couples thru DI Mux 61a back to MSG_REG 61b for latching the data in preparation for another DES stage of the 3DES process.

FIG. 1K details something of the path length and the possible areas for gate delays in these and the other identified paths. Note, in FIG. 1K, Path3 67 (the loopback path for 3DES processing) is the worst case path, because Path3 67 has more gate delays as compared to paths Path1 65 and Path2 66. Path3 67 comprises permutation block PB 61c, Mux A 61e, 8 cipher blocks 61f, inverse permutation block PB 61d feedback coupled thru DI Mux 61a back to MSG_REG 61b, PB 61d also feeding data to PRE_DO 61h. In PathDO 69, PRE_DO 61h holds data prior to the XOR 63a operation during initialization, or selectively transfers the data to output register DO_REG 63e based on control by the 3DES_in_prgs signal 63d during the last DES processing operation of a 3DES process. Note, in PathDO 69, tB 70 indicates the path delay timing from the output of PRE_DO 61h to the input of DO_REG 63e. The timing of tB 70 relative to the data output path PathDO 69 will be addressed further in a subsequent discussion of the improved scheme B of FIG. 1J.

In addition to the gate count, real estate, and power reductions afforded to the use of a single DES engine 61 for 3DES processing, the inventor of the present invention has further realized that gate delay reductions may be made to the circuit to improve the timing of the worst case critical timing Path3 67. The inventor further realized that these gate delay reductions were advantageous to obtaining the gigabit/s processing speeds desired, as provided by the 3DES IPsec circuit 60 of scheme A. The inventor observed that in the worst case critical path Path3 67, data processed through the permutation block PB 61c, is cancelled as it is processed again through the inverse permutation block IPB 61d resulting in no requirement for the permutation in Path3 67. Therefore, these permutation blocks (e.g., PB 61c and IPB 61d) may be effectively moved out of Path3 67. This change then provides other opportunities for reductions. For example, the permutation block PB 61c may be moved to the input data ports of the MSG_REG 61b to remove it from Path3 67. In addition, the inverse permutation block IPB 61d may be moved to the output of the PRE_DO 61h register, where a cycle of timing may be essentially "stolen" during the $8^{th}$ clock cycle by performing the inverse permutation during the same clock cycle as the XOR operation. This is possible, because the PathDO 69 timing allows sufficient clock margin during the $8^{th}$ clock cycle to keep the processing time within one clock cycle as illustrated by timing tB 70.

FIG. 1J illustrates one exemplary implementation of the proposed gate delay reduction strategy, resulting in the improved 3DES IPsec circuit 80 of scheme B. The improved 3DES IPsec circuit 80 of FIG. 1J is similar to that of FIG. 1I and therefore need not be described again in full detail for the sake of brevity. 3DES IPsec circuit 80, for example, comprises a single DES engine 81, a keys input section 82, and a data output section 83. The improved 3DES IPsec circuit 80 is similarly operable to cryptographically process a plaintext message M (e.g., a 64 bit block of data) into a 3DES cyphertext C using a set of secret keys (e.g., $skey_{0-7}$, $skey_{8-15}$) utilizing a single DES engine 81.

By relocating the PB and IPB outside the critical timing paths (e.g., paths which include the 8 cipher blocks), relative to that of circuit 60 of scheme A, the critical path timings are improved as well as the number of critical timing paths, as indicated in the Scheme B column of the spreadsheet comparison of FIG. 1K. By reducing the number and length (delay times) of critical timing paths in this way, each DES process of a 3DES process may be completed within two clock cycles. Thus, in accordance with the present invention, the timing improvements of the 3DES IPsec circuit 80 of scheme B, enable gigabit/s processing speeds to be realized while utilizing the single DES engine 81. Further, the improved 3DES circuit 80, eliminates the need for Mux A 61e and R0_TMP/L0_TMP 61G in contrast to that of circuit 60 of FIG. 1I, thereby reducing the circuit gate count, chip real estate, and the associated power consumption.

The single DES engine 81 of the improved 3DES IPsec circuit 80, comprises permutation block PB 81a, a DI Mux 81b, an intermediate result register R_REG/L_REG 81c. 1I. The single DES engine 81 further comprises 8 cipher blocks 81d, PDO Mux 81e and PRE_DO 81f.

The keys input section 82, comprises a Key Mux 82a coupled to a key register SK_REG 82b coupled to the 8 cipher blocks 81d. The keys input section 82 is operable to select one of a set of secret keys (e.g., $skey_{0-7}$, $skey_{8-15}$), and transfer the selected keys to the 8 cipher blocks 81d. For example,
skey0,8 to cipher block 1,
skey1,9 to cipher block 2,
skey2,10 to cipher block 3,
. . .
skey7,16 to cipher block 8.

Finally, the data output section 83 comprises an inverse permutation block IPB 83a, a logical XOR function 83b for exclusive Oring an initialization vector 83c with the processed data from the IPB 83a, a data output multiplexor DO Mux 83d, selected by a 3DES_in_prgs signal 83e, and fed to a data output register DO_REG 83f. The data output section 83 selectively initializes the 3DES process, or finalizes the 3DES process, and latches the final data output result.

The timing paths of the improved 3DES IPsec circuit 80 and the timing scheme B using a single DES engine, will now be described. The timing paths of circuit 80 comprise a Path1 85, and a Path2 86 through the single DES engine 81, a PathSK 88 through the keys input section 82, and a PathDO 89 through the data output section 83. Note, as indicated earlier, the order and timing of each of the paths described herein have no bearing on the numbers used in the path labels. In fact one or more of the paths may run concurrently, consecutively, or begin and end independently of other paths. For example, PathSK 88 may run concurrently with Path1 85 and/or Path2 86 to supply the keys needed during the processing of the 8 cipher blocks 81d.

Referencing FIG. 1J and the spreadsheet of FIG. 1K, the single DES engine 81 of circuit 80 and timing scheme B contains only two critical timing paths, Path1 85, and Path 2 86. Operationally, for example, a 64 bit block of data is input as a plaintext message M to an initial permutation processing by PB 81a, initially selected by DI Mux 81b and stored in right and left halves in the R_REG/L_REG 81c in a first clock cycle (e.g., clock cycle 1) as indicated in FIG. 1G. Then, in one example, Path2 86 is used comprising the first 8 steps of the DES processing, with the result fed back to R_REG/L_REG 81c to temporarily store the result of the first 8 steps of processing (e.g., the right and left 32 bit halves of the 64 bit block) within one clock cycle (e.g., clock cycle 2). Path1 85 is then used comprising the second 8 steps of the DES process in the next clock cycle (e.g., clock cycle 3), using PRE_DO 81f to temporarily register the result of the second 8 steps of the processing (e.g., the right and left 32 bit halves of the 64 bit block stored in register PRE_DO 81f). By contrast to MSG_REG 61b of FIG. 1I, register R_REG/L_REG 81c of FIG. 1J has a dual purpose, storing the initial permutation of M as well as the result of the first 8 steps of the DES process, while MSG_REG 61b only stores M (within a single DES processing of a 3DES process). Both MSG_REG 61b of FIG. 1I, and R_REG/L_REG 81c of FIG. 1J, store the second 8 step results for the next DES processing of a 3DES process.

Meanwhile, PathSK 88 may run concurrently with Path1 85 and Path2 86 to supply the keys needed during the processing of the 8 cipher blocks 81d for paths Path1 85 and Path2 86. Path1 85 and Path2 86, and PathSK 88 will be repeated during each of the remaining DES processes (e.g., during clock cycles 4-7) of the Three DES process, with feedback to R_REG/L_REG 81c to temporarily hold the data for the next DES process. On the final half of the third DES process of the 3DES process, Path1 85 is traversed to PRE_DO 81f followed by PathDO 89 through the data output section 83 to finalize the 3DES processing (e.g., during clock cycle 8). The PathDO 89 processes through the inverse permutation IPB 83a, the XOR 83b, then, with the aid of feedback thru the data output multiplexor DOMux 83d, as selected by the 3DES_in_prgs signal 83e, latches the cryptographically processed result into the data output register DO_REG 83f. Note, for the "back-to-back" 3DES processing, this path needs to be completed within one clock cycle.

As indicated the timing in clock cycles 2-7 is improved by the relocation of PB 81a and IPB 83a outside the critical timing paths Path1 85 and Path2 86 (e.g., paths which include the 8 cipher blocks), as indicated by the 6 clock cycles of the 3DES process 91. In addition, the timing of the final (e.g., $7^{th}$ and $8^{th}$) clock cycles contributes to this improvement, as evidenced in the PathDO 89 output path as follows. The inventor realized that the PathDO 89 output path must be completed within 1 clock cycle (e.g., the $8^{th}$ clock cycle), so that the 3DES process may be completed within 8 cycles and provide the gigabit/s processing speeds. On the $7^{th}$ positive clock cycle edge, the 3DES result (not including the inverse permutation and IV, of timing 92) is ready at PRE_DO 81f as indicated in timing 93. The output is registered on the $8^{th}$ clock edge, however, there is sufficient time remaining from the $7^{th}$ clock edge to the $8^{th}$ clock edge to perform the final IPB+the IV XOR functions 92, and latch the 3DES result 93 in DO_REG 83f.

Thus, the improved 3DES IPsec circuit 80 of the present invention is operable to cryptographically process a 64 bit message block into a 3DES result utilizing a single DES engine and a set of secret keys within 8 clock cycles at gigabit per second processing speeds. The invention thus facilitates expeditious security processing in a 3DES IPsec circuit 5 or device utilizing a single DES engine 5a, wherein the circuit 5 may be used together with a network interface device 6 for processing of incoming and outgoing data between the network 8 and the host system 7. In addition, the DES-CBC and the 3DES-CBC mode may be used in the 3DES IPsec circuit (e.g., circuit 5, 20, 60, 80) when provided a 64-bit block message M, and a 64-bit security key (including 8 parity bits) using the cipher block chaining (CBC) algorithm with explicit initialization vector (IV). Moreover, the various aspects of the invention provide a reduction in gate counts, chip real estate, and power consumption by using only the single DES engine (e.g., 5a, 21, 61, 81), improved 3DES process timing by the relocation of permutation functions (e.g., 61c and 61d, 81a, 61, 81) and the elimination of specific circuit components (e.g., Mux A 61e, Register RO_TMP/L0_TMP 61g), and skillfully choreographed path timings in circuit 5 and 80.

A structural/functional and operational overview of an exemplary network controller (e.g., the network interface device 6) in accordance with the present invention will be provided below in conjunction with FIGS. 2-4, in order to facilitate a thorough understanding of the present invention.

Figure 2:
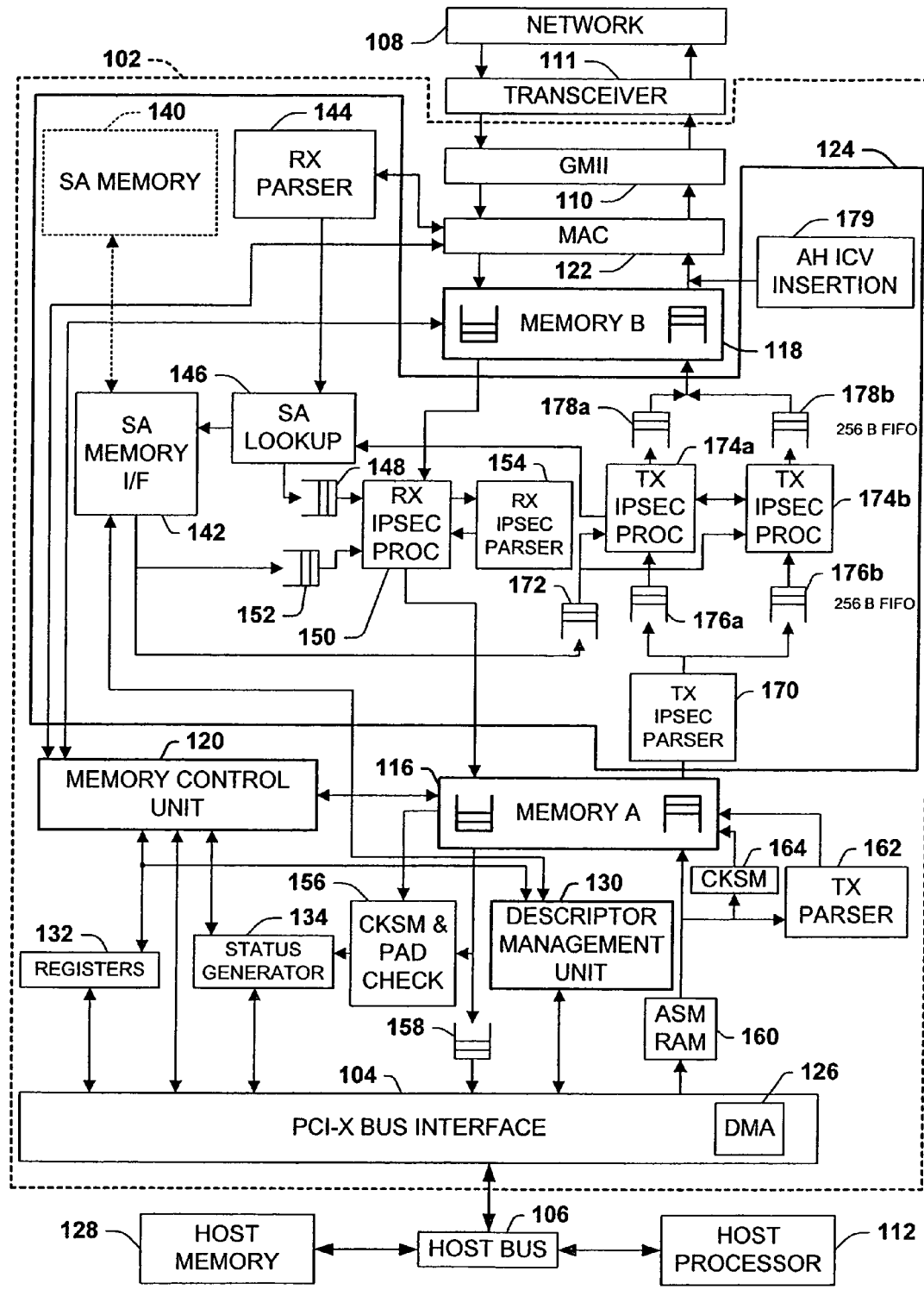
FIG. 2 is a schematic diagram illustrating another exemplary network interface device in which various aspects of the invention may be carried out.
Figure 3:
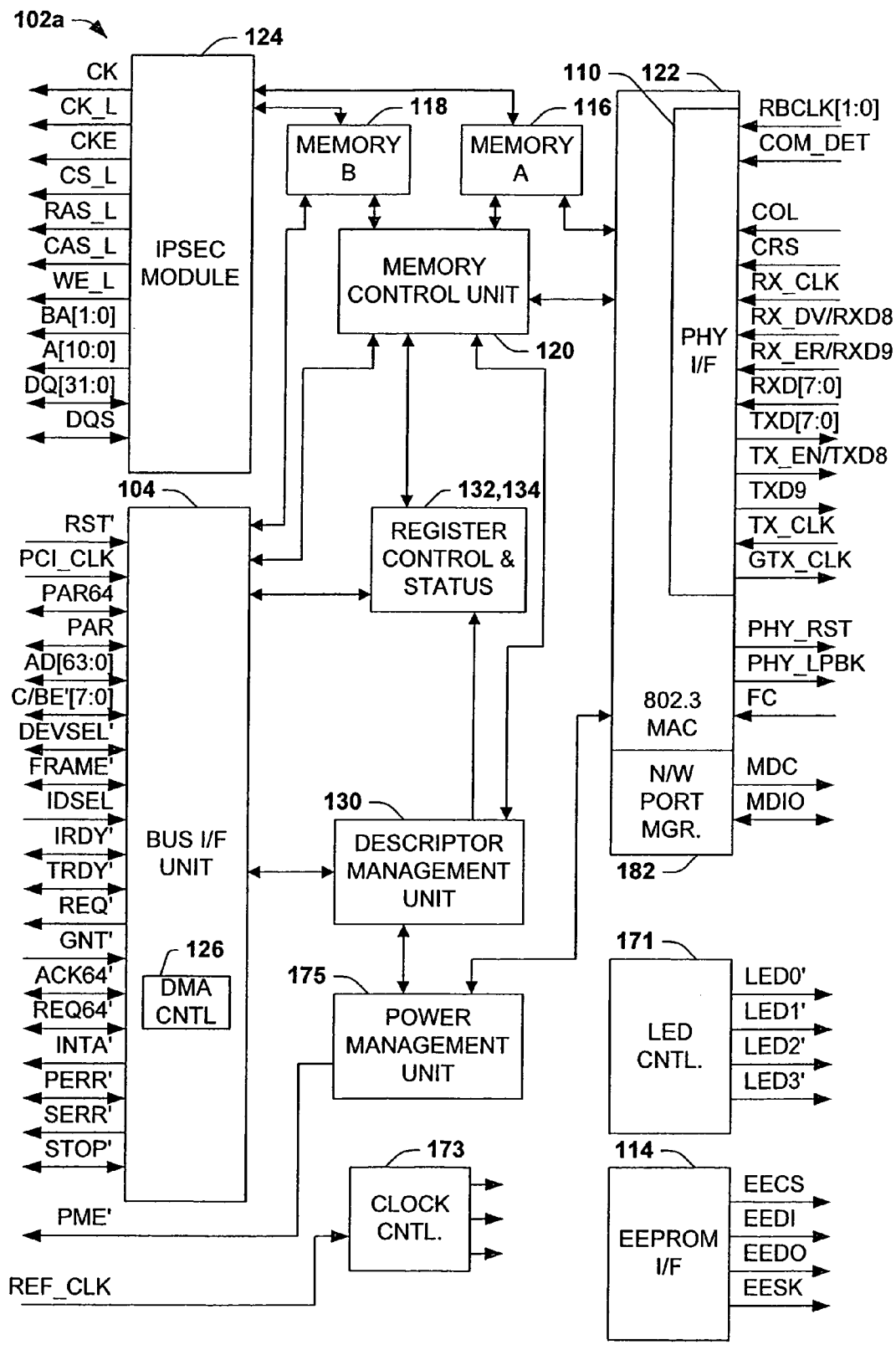
FIG. 3 is a schematic diagram illustrating an exemplary single-chip network controller implementation of the network interface device of FIG. 2.
Figure 4:
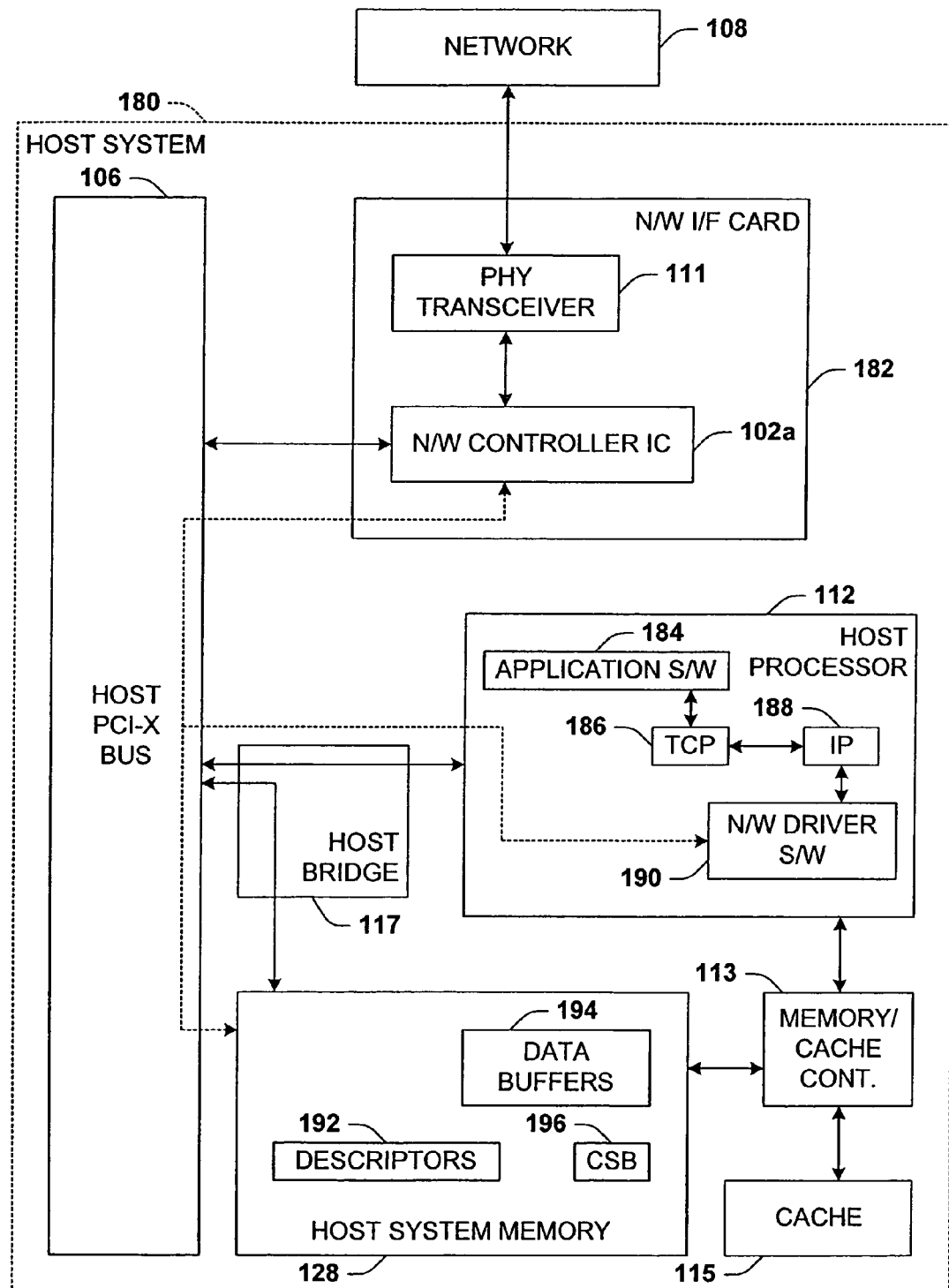
FIG. 4 is a schematic diagram illustrating a host system interfacing with a network using the exemplary network controller of FIG. 3.
Figure 5:
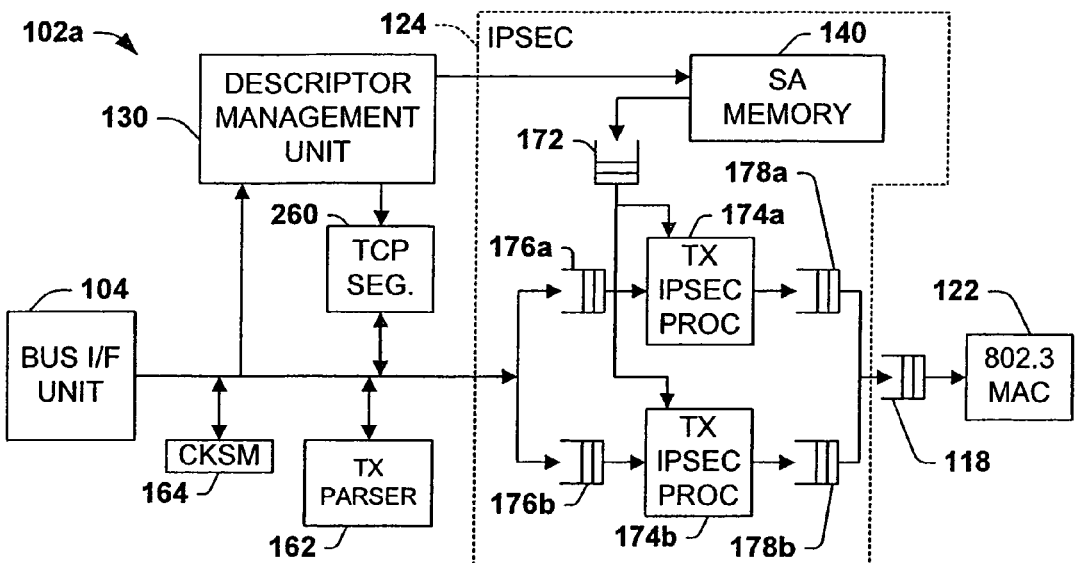
FIG. 5 is a schematic diagram illustrating security processing of outgoing data in the network interface device of FIG. 3.

FIG. 2 illustrates a network interface peripheral or network controller 102 in accordance with one or more aspects of the present invention, and FIGS. 3 and 4 illustrate an exemplary single-chip implementation 102a of the network controller 102. The exemplary single-chip network controller 102a includes all the functionality and components described herein with respect to the network interface device 102. The various blocks, systems, modules, engines, etc. described herein may be implemented using any appropriate analog and/or digital circuitry, wherein one or more of the blocks, etc. described herein may be combined with other circuitry in accordance with the invention.

The network controller 102 includes a 64-bit PCI-X bus interface 104 for connection with a host PCI or PCI-X bus 106 that operates at a clock speed up to 133 MHz in PCI-X mode or up to 66 MHz in standard PCI mode. The network controller 102 may be operated as a bus master or a slave. Much of the initialization can be done automatically by the network controller 102 when it reads an optional EEPROM (not shown), for example, via an EEPROM interface 114 (FIG. 3). The network controller 102 can be connected to an IEEE 802.3 or proprietary network 108 through an IEEE 802.3-compliant Media Independent Interface (MII) or Gigabit Media Independent Interface (GMII) 110, for interfacing the controller 102 with the network 108 via an external transceiver device 111. For 1000 Mb/s (1 Gb/s) operation the controller 102 supports either the byte-wide IEEE 802.3 Gigabit Media Independent Interface (GMII) for 1000BASE-T PHY devices 111 or the IEEE 802.3 Ten-Bit Interface (TBI) for 1000BASE-X devices 111. The network controller 102 supports both half-duplex and full-duplex operation at 10 and 100 Mb/s rates and full-duplex operation at 1000 Mb/s.

A host device, such as a host processor 112 on the host PCI-X bus 106 in a host system 180, may interface with the network controller 102 via the bus 106 and a host bridge 117. The host processor 112 includes one or more processors that can operate in a coordinated fashion. Referring also to FIG. 4, the network single-chip network controller 102*a* may be provided on a network interface card or circuit board 182, together with a PHY transceiver 111 for interfacing the host processor 112 with the network 108 via the host bridge 117, the host bus 106, and the transceiver 111. The PCI-X bus interface 104 includes PCI configuration registers used to identify the network controller 102*a* to other devices on the PCI bus and to configure the device. Once initialization is complete, the host processor 112 has direct access to the I/O registers of the network controller 102 for performance tuning, selecting options, collecting statistics, and starting transmissions through the host bridge 117 and the bus 106. The host processor 112 is operatively coupled with the host system memory 128 and a cache memory 115 via a memory/cache controller 113. One or more application software programs 184 executing in the host processor 112 may be provided with network service via layer 4 (e.g., transport layer) software, such as transmission control protocol (TCP) layer software 186, layer 3 (e.g., network layer) software 188, such as internet protocol (IP) software 188, and a software network driver 190, also running on the host processor 112. As discussed below, the network driver software 190 interacts with the host memory 128 and the network controller 102 to facilitate data transfer between the application software 184 and the network 108.

As illustrated in FIG. 2, the exemplary network controller 102 comprises first and second internal random access memories MEMORY A 116 and MEMORY B 118, organized as first-in first-out (FIFO) memories for storage of frames. A memory control unit 120 is provided for control and operation of the memories 116 and 118. The network controller 102 also comprises a media access control (MAC) engine 122 satisfying requirements for operation as an Ethernet/IEEE 802.3-compliant node and providing the interface between the memory 118 and the GMII 110. The MAC engine 122 may be operated in full or half-duplex modes. An Internet Protocol Security (IPsec) engine 124 coupled with the memories 116 and 118 provides authentication and/or encryption functions.

The PCI-X bus interface 104 includes a Direct Memory Access (DMA) controller 126 that automatically transfers network frame data between the network controller 102 and buffers in host system memory 128 via the host bus 106. The operation of the DMA controller 126 is directed by a descriptor management unit 130 according to data structures called descriptors 192, which include pointers to one or more data buffers 194 in system memory 128, as well as control information. The descriptors 192 are stored in the host system memory 128 in queues called descriptor rings. Four transmit descriptor rings are provided for transmitting frames and four receive descriptor rings for receiving frames, corresponding to four priorities of network traffic in the illustrated controller 102. Additionally, four receive status rings are provided, one for each priority level that facilitates synchronization between the network controller 102 and the host system. Transmit descriptors 192 control the transfer of frame data from the system memory 128 to the controller 102, and receive descriptors 192 control the transfer of frame data in the other direction. In the exemplary controller 102, each transmit descriptor 192 corresponds to one network frame, whereas each receive descriptor 192 corresponds to one or more host memory buffers in which frames received from the network 108 can be stored.

The software interface allocates contiguous memory blocks for descriptors 192, receiver status, and data buffers 194. These memory blocks are shared between the software (e.g., the network driver 190) and the network controller 102 during normal network operations. The descriptor space includes pointers to network frame data in the buffers 194, the receiver status space includes information passed from the controller 102 to the software in the host 112, and the data buffer areas 194 for storing frame data that is to be transmitted (e.g., outgoing data) and for frame data that has been received (e.g., incoming data).

Synchronization between the controller 102 and the host processor 112 is maintained by pointers stored in hardware registers 132 in the controller 102, pointers stored in a controller status block (CSB) 196 in the host system memory 128, and interrupts. The CSB 196 is a block of host system memory 128 that includes pointers into the descriptor and status rings and a copy of the contents of the controller's interrupt register. The CSB 196 is written by the network controller 102 and read by the host processor 112. Each time the software driver 190 in the host 112 writes a descriptor or set of descriptors 192 into a descriptor ring, it also writes to a descriptor write pointer register in the controller 102. Writing to this register causes the controller 102 to start the transmission process if a transmission is not already in progress. Once the controller has finished processing a transmit descriptor 192, it writes this information to the CSB 196. After receiving network frames and storing them in receive buffers 194 of the host system memory 128, the controller 102 writes to the receive status ring and to a write pointer, which the driver software 190 uses to determine which receive buffers 194 have been filled. Errors in received frames are reported to the host memory 128 via a status generator 134.

The IPsec module or engine 124 provides standard authentication, encryption, and decryption functions for transmitted and received frames. For authentication, the IPsec module 124 implements the HMAC-MD5-96 algorithm defined in RFC 2403 (a specification set by the Internet Engineering Task Force) and the HMAC-SHA-1-96 algorithm defined in RFC 2404. For encryption, the module implements the ESP DES-CBC (RFC 2406), the 3DES-CBC, and the AES-CBC encryption algorithms. For transmitted frames, the controller 102 applies IPsec authentication and/or encryption as specified by Security Associations (SAs) stored in a private local SA memory 140, which are accessed by IPsec system 124 via an SA memory interface 142. SAs are negotiated and set by the host processor 112. SAs include IPsec keys, which are required by the various authentication, encryption, and decryption algorithms, IPsec key exchange processes are performed by the host processor 112. The host 112 negotiates SAs with remote stations and writes SA data to the SA memory 140. The host 112 also maintains an IPsec Security Policy Database (SPD) in the host system memory 128.

A receive (RX) parser 144 associated with the MAC engine 122 examines the headers of received frames to determine what processing needs to be done. If it finds an IPsec header, it uses information contained in the header, including a Security Parameters Index (SPI), an IPsec protocol type, and an IP destination address to search the SA memory 140 using SA lookup logic 146 and retrieves the applicable security association. The result is written to an SA pointer FIFO memory 148, which is coupled to the lookup logic 146 through the SA memory interface 142. The key corresponding to the SA is fetched and stored in RX key FIFO 152. A receive (RX) IPsec processor 150 performs the processing requires by the applicable SA using the key. The controller 102 reports what security processing it has done, so that the host 112 can check the SPD to verify that the frame conforms with policy. The processed frame is stored in the memory 116.

A receive IPsec parser 154, associated with IPsec processor 150, performs parsing that cannot be carried out before packet decryption. Some of this information is used by a receive (Rx) checksum and pad check system 156, which computes checksums specified by headers that may have been encrypted and also checks pad bits that may have been encrypted to verify that they follow a pre-specified sequence for pad bits. These operations are carried out while the received frame is passed to the PCI-X bus 104 via FIFO 158. The checksum and pad check results are reported to the status generator 134.

In the transmit path, an assembly RAM 160 is provided to accept frame data from the system memory 128, and to pass the data to the memory 116. The contents of a transmit frame can be spread among multiple data buffers 194 in the host memory 128, wherein retrieving a frame may involve multiple requests to the system memory 128 by the descriptor management unit 130. These requests are not always satisfied in the same order in which they are issued. The assembly RAM 160 ensures that received chunks of data are provided to appropriate locations in the memory 116. For transmitted frames, the host 112 checks the SPD (Ipsec Security Policy Database) to determine what security processing is needed, and passes this information to the controller 102 in the frame's descriptor 192 in the form of a pointer to the appropriate SA in the SA memory 140. The frame data in the host system memory 128 provides space in the IPsec headers and trailers for authentication data, which the controller 102 generates. Likewise, space for padding (to make the payload an integral number of blocks) is provided when the frame is stored in the host system memory buffers 194, but the pad bits are written by the controller 102.

As the data is sent out from the assembly RAM 160, it passes also into a first transmit (TX) parser 162, which reads the MAC header, the IP header (if present), the TCP or UDP header, and determines what kind of a frame it is, and looks at control bits in the associated descriptor. In addition, the data from the assembly RAM 160 is provided to a transmit checksum system 164 for computing IP header and/or TCP checksums, which values will then be inserted at the appropriate locations in the memory 116. The descriptor management unit 130 sends a request to the SA memory interface 142 to fetch an SA key, which is then provided to a key FIFO 172 that feeds a pair of TX IPsec processors 174a and 174b. Frames are selectively provided to one of a pair of TX IPsec processors 174a and 174b for encryption and authentication via TX IPsec FIFOs 176a and 176b, respectively, wherein a transmit IPsec parser 170 selectively provides frame data from the memory 116 to a selected one of the processors 174. The two transmit IPsec processors 174 are provided in parallel because authentication processing cannot begin until after encryption processing is underway. By using the two processors 174, the speed is comparable to the receive side where these two processes can be carried out simultaneously.

Authentication does not cover mutable fields, such as occur in IP headers. The transmit IPsec parser 170 accordingly looks for mutable fields in the frame data, and identifies these fields to the processors 174a and 174b. The output of the processors 174a and 174b is provided to the second memory 118 via FIFOs 178a and 178b, respectively. An Integrity Check Value (ICV), which results from authentication processing, is inserted into the appropriate IPsec header by an insertion unit 179 as the frame data is passed from the memory 118 to the MAC engine 122 for transmission to the network 108.

In the single-chip implementation of FIG. 3, the controller 102a comprises a network port manager 182, which may automatically negotiate with an external physical (PHY) transceiver via management data clock (MDC) and management data I/O (MDIO) signals. The network port manager 175 may also set up the MAC engine 122 to be consistent with the negotiated configuration. Circuit board interfacing for LED indicators is provided by an LED controller 171, which generates LED driver signals LED0'-LED3' for indicating various network status information, such as active link connections, receive or transmit activity on the network, network bit rate, and network collisions. Clock control logic 173 receives a free-running 125 MHz input clock signal as a timing reference and provides various clock signals for the internal logic of the controller 102a.

A power management unit 188, coupled with the descriptor management unit 130 and the MAC engine 122, can be used to conserve power when the device is inactive. When an event requiring a change in power level is detected, such as a change in a link through the MAC engine 122, the power management unit 188 provides a signal PME' indicating that a power management event has occurred. The external serial EEPROM interface 114 implements a standard EEPROM interface, for example, the 93Cxx EEPROM interface protocol. The leads of external serial EEPROM interface 114 include an EEPROM chip select (EECS) pin, EEPROM data in and data out (EEDI and EEDO, respectively) pins, and an EEPROM serial clock (EESK) pin.

In the bus interface unit 104, address and data are multiplexed on bus interface pins AD[63:0]. A reset input RST' may be asserted to cause the network controller 102a to perform an internal system reset. A cycle frame I/O signal FRAME' is driven by the network controller when it is the bus master to indicate the beginning and duration of a transaction, and a PCI clock input PCI_CLK is used to drive the system bus interface over a frequency range of 15 to 133 MHz on the PCI bus (e.g., host bus 106). The network controller 102a also supports Dual Address Cycles (DAC) for systems with 64-bit addressing, wherein low order address bits appear on the AD[31:0] bus during a first clock cycle, and high order bits appear on AD[63:32] during the second clock cycle. A REQ64' signal is asserted by a device acting as bus master when it wants to initiate a 64-bit data transfer, and the target of the transfer asserts a 64-bit transfer acknowledge signal ACK64' to indicate that it is willing to transfer data using 64 bits. A parity signal PAR64 is an even 8 byte parity signal that protects AD[63:32] The bus master drives PAR64 for address and write data phases and the target drives PAR64 for read data phases.

The network controller 102a asserts a bus request signal REQ' to indicate that it wishes to become a bus master, and a bus grant input signal GNT' indicates that the access to the bus has been granted to the network controller. An initialization device select input signal IDSEL is used as a chip select for the network controller during configuration read and write transactions. Bus command and byte enable signals C/BE[7:0] are used to transfer bus commands and to indicate which physical bytes of data lines AD[63:0] carry meaningful data. A parity I/O signal PAR indicates and verifies even parity across AD[31:0] and C/BE[3:0].

The network controller drives a drive select I/O signal DEVSEL' when it detects a transaction that selects the network controller 102a as a target. The network controller 102a checks DEVSEL' to see if a target has claimed a transaction that the network controller initiated. TRDY' is used to indicate the ability of the target of the transaction to complete the current data phase, and IRDY' indicates the ability of the initiator of the transaction to complete the current data phase. Interrupt request output signal INTA' indicates that one or more enabled interrupt flag bits are set. The network controller 102a asserts a parity error I/O signal PERR' when it detects a data parity error, and asserts a system error output signal SERR' when it detects an address parity error. In addition, the controller 102a asserts a stop I/O signal STOP' to inform the bus master to stop the current transaction.

In the MAC engine 122, a physical interface reset signal PHY_RST is used to reset the external PHY 111 (MII, GMII, TBI), a PHY loop-back output PHY_LPBK is used to force an external PHY device 111 into loop-back mode for systems testing, and a flow control input signal FC controls when the MAC transmits a flow control frame. The network controller 102a provides an external PHY interface 110 that is compatible with either the Media Independent Interface (M11), Gigabit Media Independent Interface (GMII), or Ten Bit Interface (TBI) per IEEE Std 802.3. Receive data input signals RXD[7:0] and output signals TXD[7:0] are used for receive and transmit data exchange, respectively. When the network controller 102a is operating in GMII or MII mode, TX_EN/TXD[8] is used as a transmit enable. In TBI mode, this signal is bit 8 of the transmit data bus. RX_DV/RXD[8] is an input used to indicate that valid receive data is being presented on the RX pins. In TBI mode, this signal is bit 8 of the receive data bus.

When the network controller 102a is operating in GMII or MII mode, RX_ER/RXD[9] is an input that indicates that the external transceiver device has detected a coding error in the receive frame currently being transferred on the RXD pins. In TBI mode, this signal is bit 9 of the receive data bus. M11 transmit clock input TX_CLK is a continuous clock input that provides the timing reference for the transfer of the TX_EN and TXD[3:0] signals out of the network controller 102a in MII mode. GTX_CLK is a continuous 125 MHz clock output that provides the timing reference for the TX_EN and TXD signals from the network controller when the device is operating in GMII or TBI mode. RX_CLK is a clock input that provides the timing reference for the transfer of signals into the network controller when the device is operating in MII or GMII mode. COL is an input that indicates that a collision has been detected on the network medium, and a carrier sense input signal CRS indicates that a non-idle medium, due either to transmit or receive activity, has been detected (CRS is ignored when the device is operating in full-duplex mode).

In TBI mode, 10-bit code groups represent 8-bit data packets. Some 10-bit code groups are used to represent commands. The occurrence of even and odd code groups and special sequences called commas are all used to acquire and maintain synchronization with the PHY 110. RBCLK[0] is a 62.5 MHz clock input that is used to latch odd-numbered code groups from the PHY device, and RBCLK[1] is used to latch even-numbered code groups. RBCLK[1] is always 180 degrees out of phase with respect to RBCLK[0]. COM_DET is asserted by an external PHY 111 to indicate the code group on the RXD[9:0] inputs includes a valid comma.

The IPsec module 124 includes an external RAM interface to memories 116 and 118. When CKE is driven high, an internal RAM clock is used to provide synchronization, otherwise the differential clock inputs CK and CK_L are used. The RAM's have a command decoder, which is enabled when a chip select output CS_L is driven low. The pattern on the WE_L, RAS_L, and CAS_L pins defines the command that is being issued to the RAM. Bank address output signals BA[1:0] are used to select the memory to which a command is applied, and an address supplied by RAM address output pins A[10:0] selects the RAM word that is to be accessed. A RAM data strobe I/O signal DQS provides the timing that indicates when data can be read or written, and data on RAM data I/O pins DQ[31:0] are written to or read from either memory 116 or 118.

Returning again to FIG. 2, an operational discussion of receive and transmit operation of the network controller 102 is provided below. Starting with receipt of a data frame from the network media 108 (e.g., an optical fiber), the frame is delivered to the GMII 110 (the Gigabit Media-Independent Interface), for example, as a series of bytes or words in parallel. The GMII 110 passes the frame to the MAC 122 according to an interface protocol, and the MAC 122 provides some frame management functions. For example, the MAC 122 identifies gaps between frames, handles half duplex problems, collisions and retries, and performs other standard Ethernet functions such as address matching and some checksum calculations. The MAC 122 also filters out frames, checks their destination address and accepts or rejects the frame depending on a set of established rules.

The MAC 122 can accept and parse several header formats, including for example, IPv4 and IPv6 headers. The MAC 122 extracts certain information from the frame headers. Based on the extracted information, the MAC 122 determines which of several priority queues (not shown) to put the frame in. The MAC places some information, such as the frame length and priority information, in control words at the front of the frame and other information, such as whether checksums passed, in status words at the back of the frame. The frame passes through the MAC 122 and is stored in the memory 118 (e.g., a 32 KB RAM). In this example, the entire frame is stored in memory 118. The frame is subsequently downloaded to the system memory 128 to a location determined by the descriptor management unit 130 according to the descriptors 192 in the host memory 128 (FIG. 4), wherein each receive descriptor 192 comprises a pointer to a data buffer 194 in the system memory 128. Transmit descriptors include a pointer or a list of pointers, as will be discussed in greater detail supra. The descriptor management unit 130 uses the DMA 126 to read the receive descriptor 192 and retrieve the pointer to the buffer 194. After the frame has been written to the system memory 128, the status generator 134 creates a status word and writes the status word to another area in the system memory 128, which in the present example, is a status ring. The status generator 134 then interrupts the processor 112. The system software (e.g., the network driver 190 in FIG. 4) can then check the status information, which is already in the system memory 128. The status information includes, for example, the length of the frame, what processing was done, and whether or not the various checksums passed.

In transmit operation, the host processor 112 initially dictates a frame transmission along the network 108, and the TCP layer 186 of the operating system (OS) in the host processor 112 is initiated and establishes a connection to the destination. The TCP layer 186 then creates a TCP frame that may be quite large, including the data packet and a TCP header. The IP layer 188 creates an IP header, and an Ethernet (MAC) header is also created, wherein the data packet, and the TCP, IP, and MAC headers may be stored in various locations in the host memory 128. The network driver 190 in the host processor 112 may then assemble the data packet and the headers into a transmit frame, and the frame is stored in one or more data buffers 194 in the host memory 128. For example, a typical transmit frame might reside in four buffers

194: the first one containing the Ethernet or MAC header, the second one having the IP header, the third one the TCP header, and the fourth buffer containing the data. The network driver 190 generates a transmit descriptor 192 that includes a list of pointers to all these data buffers 194.

The frame data is read from the buffers 194 into the controller 102. To perform this read, the descriptor management unit 130 reads the transmit descriptor 192 and issues a series of read requests on the host bus 106 using the DMA controller 126. However, the requested data portions may not arrive in order they were requested, wherein the PCI-X interface 104 indicates to the DMU 130 the request with which the data is associated. Using such information, the assembly RAM logic 160 organizes and properly orders the data to reconstruct the frame, and may also perform some packing operations to fit the various pieces of data together and remove gaps. After assembly in the assembly RAM 160, the frame is passed to the memory 116 (e.g., a 32 KB RAM in the illustrated example). As the data passes from the assembly RAM 160, the data also passes to the TX parser 162. The TX parser 162 reads the headers, for example, the MAC headers, the IP headers (if there is one), the TCP or UDP header, and determines what kind of a frame it is, and also looks at the control bits that were in the associated transmit descriptor 192. The data frame is also passed to the transmit checksum system 164 for computation of TCP and/or IP layer checksums.

The transmit descriptor 192 may comprise control information, including bits that instruct the transmit checksum system 164 whether to compute an IP header checksum and/or TCP checksum. If those control bits are set, and the parser 162 identifies or recognizes the headers, then the parser 162 tells the transmit checksum system 164 to perform the checksum calculations, and the results are put at the appropriate location in the frame in the memory 116. After the entire frame is loaded in the memory 116, the MAC 122 can begin transmitting the frame, or outgoing security processing (e.g., encryption and/or authentication) can be performed in the IPsec system 124 before transmission to the network 108.

By offloading the transmit checksumming function onto the network controller 102 of the present invention, the host processor 112 is advantageously freed from that task. In order for the host processor 112 to perform the checksum, significant resources must be expended. Although the computation of the checksum is relatively simple, the checksum, which covers the entire frame, must be inserted at the beginning of the frame. In conventional architectures, the host computer makes one pass through the frame to calculate the checksum, and then inserts the checksum at the beginning of the frame. The data is then read another time as it is loaded into the controller. The network controller 102 further reduces the load on the host processor 112 by assembling the frame using direct access to the system memory 128 via the descriptors 192 and the DMA controller 126. Thus, the network controller 102 frees the host processor 112 from several time consuming memory access operations.

In addition to the receive and transmit functions identified above, the network controller 102 may also be programmed to perform various segmentation functions during a transmit operation. For example, the TCP protocol allows a TCP frame to be as large as 64,000 bytes. The Ethernet protocol does not allow data transfers that large, but instead limits a network frame to about 1500 bytes plus some headers. Even in the instance of a jumbo frame option that allows 16,000 byte network frames, the protocol does not support a 64 KB frame size. In general, a transmit frame initially resides in one or more of the data buffers 194 in system memory 128, having a MAC header, an IP header, and a TCP header, along with up to 64 KB of data. Using the descriptor management unit 130, the frame headers are read, and an appropriate amount of data (as permitted by the Ethernet or network protocol) is taken and transmitted. The descriptor management unit 130 tracks the current location in the larger TCP frame and sends the data block by block, each block having its own set of headers.

For example, when a data transmit is to occur, the host processor 112 writes a descriptor 192 and informs the controller 102. The descriptor management unit 130 receives a full list of pointers, which identify the data buffers 194, and determines whether TCP segmentation is warranted. The descriptor management unit 130 then reads the header buffers and determines how much data can be read. The headers and an appropriate amount of data are read into the assembly RAM 160 and the frame is assembled and transmitted. The controller 102 then re-reads the headers and the next block or portion of the untransmitted data, modifies the headers appropriately and forms the next frame in the sequence. This process is then repeated until the entire frame has been sent, with each transmitted portion undergoing any selected security processing in the IPsec system 124.

The network controller 102 of the present invention also advantageously incorporates IPSec processing therein. In contrast with conventional systems that offload IPSec processing, the present invention employs on-board IPSec processing, which may be implemented as a single-chip device 102a (FIG. 3). In conventional systems, either the host processor carries out IPSec processing or a co-processor, separate from the network controller, is employed. Use of the host processor is very slow, and in either case, the frame passes at least three times through the memory bus. For example, when a co-processor is used, the frame passes through the bus once as it is read from memory and sent to the co-processor, again as it passes back to the system memory, and a third time as it is sent to the network controller. This processing consumes significant bandwidth on the PCI bus and negatively impacts system performance. A similar performance loss is realized in the receive direction.

IPSec processing has two primary goals: first is to encrypt, or scramble, the data so that an unauthorized person or system cannot read the data. The second goal is authentication, which ensures that the packet is uncorrupted and that the packet is from the expected person or system. A brief discussion of the on-board IPSec processing follows below. The network controller 102 of the present invention takes advantage of security associations (SAs) using the SA memory interface 142, the SA lookup 146, and the SA memory 140. As briefly highlighted above, a security association is a collection of bits that describe a particular security protocol, for example, whether the IPSec portion 124 is to perform an encryption or authentication, or both, and further describes what algorithms to employ. There are several standard encryption and authentication algorithms, so the SA interface 142 and SA lookup 146 indicates which one is to be used for a particular frame. The SA memory 140 in the present example is a private memory, which stores the encryption keys. The SAs are obtained according to an IPSec protocol whereby sufficient information is exchanged with a user or system on the network to decide which algorithms to use and allow both parties to generate the same keys. After the information exchange is completed, the software calls the driver 190, which writes the results into the SA memory 140.

Once the key exchange is complete, the appropriate bits reside in the SA memory 140 that indicate which key is to be used and which authentication algorithm, as well as the actual keys. In transmit mode, part of the descriptor 192 associated with a given outgoing frame includes a pointer into the SA memory 140. When the descriptor management unit 130 reads the descriptor 192, it sends a request to the SA memory interface 142 to fetch the key, which then sends the key to the key FIFO 172, that feeds the TX IPSec processing modules 174a and 174b, respectively. When both encryption and authentication are to be employed in transmit, the process is slightly different because the tasks are not performed in parallel. The authentication is a hash of the encrypted data, and consequently, the authentication waits until at least a portion of the encryption has been performed. Because encryption may be iterative over a series of data blocks, there may be a delay between the beginning of the encryption process and the availability of the first encrypted data. To avoid having this delay affect device performance, the exemplary network interface 102 employs two TX IPSec process engines 174a and 174b, wherein one handles the odd numbered frames and the other handles the even numbered frames in the illustrated example.

Prior to performing the IPSec processing, the TX IPsec parser 170 parses the frame headers and looks for mutable fields therein, which are fields within the headers that are not authenticated because they vary as the frame travels over the network 108.

For example, the destination address in the IP header varies as the frame goes across the Internet from router to router. The transmit IPsec parser 170 identifies the mutable fields and passes the information to the TX IPSec processors 174, which selectively skip over the mutable field portions of the frames. The processed frames are sent to FIFOs 178a and 178b and subsequently accumulated in the memory 118. The result of the authentication processing is an integrity check value (ICV), which is inserted by insertion block 179 into the appropriate IPsec header as the frame is transmitted from the memory 118 to the network media 108.

In receive mode, a received frame comes into the MAC 122 and the RX parser 144. The RX parser 144 parses the incoming frame up to the IPsec headers and extracts information therefrom. The fields that are important to the RX parser 144 are, for example, the destination IP address in the EP header, the SPI (Security Protocol Index), and a protocol bit that indicates whether an IPsec header is an authentication header (AH) or an encapsulation security protocol (ESP) header. Some of the extracted information passes to the SA lookup block 146. The SA lookup block 146 identifies the appropriate SA and conveys the information to the SA memory interface 142 that retrieves the SA and places it into the key FIFO 152.

The SA lookup block 146 employs an on-chip SPI Table and the off-chip SA memory 140. The SPI Table is organized into 4096 bins, each comprising 4 entries. The entries include the 32-bit SPI, a hash of the destination address (DA), a bit to indicate the protocol, and a bit to indicate whether the entry is used. Corresponding entries in the SA memory contain the full DAs and the SA (two SAs when there is both authentication and encryption). The bin for each entry is determined by a hash of the SPI. To look up an SA, a hash of the SPI from the received frame is used to determine which bin to search. Within the bin, the SA lookup block 146 searches the entries for a match to the full SPI, the destination address hash, and the protocol bit. After searching, the SA lookup block writes an entry to the SA pointer FIFO 148, which either identifies a matching entry or indicates no match was found. A check of the DA address from the SA memory is made just before security processing. If there is no match, security processing is not performed on the frame in question. Based on the entries in the SA pointer FIFO 148, the keys are fetched from the external SA memory 140 and placed in the key FIFO 152.

The RX IPSec processor 150 takes the keys that come in from the FIFO 152, reads the corresponding frame data out of the memory 118, and begins processing the frame, as required. For receive processing, decryption and authentication proceed in parallel (on receive, decryption and authentication are not sequential processes), and thus in this example only one RX IPSec processor is used.

The RX IPsec parser 154 parses the headers that follow the ESP header. Any header that follows the ESP header will be encrypted and cannot be parsed until decryption has taken place. This parsing must be completed before TCP/UDP checksums can be computed and before pad bits can be checked. The decrypted data is stored in the memory 116. To perform the TCP/UDP checksums and pad checks without having to store the frame data another time, these functions are carried out by checksum and pad check system 156 while the data is being transferred from the memory 116 to the host memory 128. In addition to the on-board IPSec processing and TCP segmentation highlighted above, the network controller 102 also provides performance improvements in the execution of interrupts. Read latencies are large when a host processor is required to read a register from a network device. These latencies negatively impact system performance. In particular, as the host processor clock speed continues to increase, the disparity between the clock speed and the time it takes to get a response from a network controller over a PCI or other host bus becomes larger. Accordingly, when a host processor needs to read from a network device, the processor must wait a greater number of clock cycles, thereby resulting in opportunity loss.

The network interface 102 avoids many read latencies by replacing read operations with write operations. Write operations are not as problematic because they can take place without involving the processor 112. Thus when write information is sent to a FIFO, as long as the writes are in small bursts, the network controller 102 can take the necessary time to execute the writes without negatively loading the processor. To avoid read operations during a transmit operation, the driver creates a descriptor 192 in the system memory 128 and then writes a pointer to that descriptor to the register 132 of the network controller 102. The DMU 130 of the controller 102 sees the contents in the register 132 and reads the necessary data directly from the system memory 128 without further intervention of the processor 112. For receive operations, the driver software 190 identifies empty buffers 194 in the system memory 128, and writes a corresponding entry to the register 132. The descriptor management unit 130 writes to pointers in the transmit descriptor rings to indicate which transmit descriptors 192 have been processed and to pointers in the status rings to indicate which receive buffers 194 have been used.

Unlike conventional architectures that require a host processor to read an interrupt register in the network controller, the present invention generates and employs a control status block (CSB) 196 located in a predetermined region of the system memory 128 (e.g., a location determined upon initialization). The network controller 102 writes to the CSB 196 any register values the system needs. More particularly, after a frame has been completely processed, prior to generating an interrupt, the network controller 102 writes a copy of the interrupt register to the CSB 196. Then the controller 102 asserts the interrupt; thus when the host processor 112 sees the interrupt in the register 132, the received data is already available in the receive data buffer 194.

Various operational and structural details of the exemplary network interface controller 102 are hereinafter provided in conjunction with the figures. In particular, details of the security processing are illustrated and described below in greater detail to facilitate an understanding of the present invention in the context of the exemplary controller 102.

Security Processing

Referring now to FIGS. 2-4, 5, 6, and 7A-7D, the exemplary IPsec security system 124 is configurable to provide Internet protocol security (Ipsec) authentication and/or encryption/decryption services for transmitted and received frames in accordance with RFC 2401. For authentication header (AH) processing the module implements the HMAC-MD5-96 algorithm defined in RFC 2404 and the HMAC-SHA-1-96 defined in RFC 2404. The HMAC-MD5-96 implementation provides a 128-bit key, a 512-bit block size, and a 128-bit message authentication code (MAC), truncated to 96 bits. The implementation of the HMAC-SHA-1-96 algorithm provides a 160-bit key, a 512-bit block size, and a 160-bit message authentication code (MAC), truncated to 96 bits. For encapsulating security payload (ESP) processing, the IPsec module 124 also implements the HMAC-MD5-96 and HMAC-SHA-1-96 algorithms for authentication and the ESP DES-CBC (RFC 2406), the 3DES-CBC, and the AES-CBC (draft-ietf-ipsec-ciph-aes-cbc-01) encryption algorithms. The DES-CBC algorithm in the IPsec module 124 provides a 64-bit key (including 8 parity bits), a 64-bit block size, and cipher block chaining (CBC) with explicit initialization vector (IV). The 3DES-CBC algorithm provides a 192-bit key (including 24 parity bits), a 64-bit block size, and CBC with explicit IV. The AES-CBC algorithm provides a 128-, 192-, or 256-bit key; 10, 12, or 14 rounds, depending on key size; a 128-bit block size, and CBC with explicit IV.

The exemplary security system 124 provides cryptographically-based Ipsec security services for IPv4 and IPv6, including access control, connectionless integrity, data origin authentication, protection against replays (a form of partial sequence integrity), confidentiality (encryption), and limited traffic flow confidentiality. These services are provided at layer 3 (IP layer), thereby offering protection for IP and/or upper layer protocols through the use of two traffic security protocols, the authentication header (AH) and the encapsulating security payload (ESP), and through the use of cryptographic key management procedures and protocols. The IP authentication header (AH) provides connectionless integrity, data origin authentication, and an optional anti-replay service, and the ESP protocol provides confidentiality (encryption), and limited traffic flow confidentiality, and may provide connectionless integrity, data origin authentication, and an anti-replay service. The AH and ESP security features may be applied alone or in combination to provide a desired set of security services in IPv4 and IPv6, wherein both protocols support transport mode and tunnel mode. In transport mode, the protocols provide protection primarily for upper layer protocols and in tunnel mode, the protocols are applied to tunneled IP packets.

For outgoing frames, the controller 102 selectively provides IPsec authentication and/or encryption processing according to security associations (SAs) stored in the SA memory 140. If an outgoing frame requires IPsec authentication, the IPsec unit 124 calculates an integrity check value (ICV) and inserts the ICV into the AH header or ESP trailer. If the frame requires encryption, the unit 124 replaces the plaintext payload with an encrypted version. For incoming (e.g., received) frames, the IPsec unit 124 parses IPsec headers to determine what processing needs to be done. If an IPsec header is found, the IPsec system 124 uses the security parameters index (SPI) from the header plus the IPsec protocol type and IP destination address to search the SA memory 140 to retrieve a security association corresponding to the received frame. Acceptable combinations of IPsec headers for the exemplary controller 102 include an AH header, an ESP header, and an AH header followed by an ESP header.

For IPsec key exchange, the host 112 negotiates SAs with remote stations and writes SA data to the SA memory 140. In addition, the host 112 maintains an IPsec security policy database (SPD) in the system memory 128. For each transmitted frame the host processor 112 checks the SPD to determine what security processing is needed, and passes this information to the controller 102 in the transmit descriptor 192 as a pointer SA_PTR[14:0] to the appropriate SA in the SA memory 140. For incoming received frames the controller 102 reports what security processing it has done in a receive status ring entry, and the host processor 112 checks the SPD to verify that the frame conforms with the negotiated policy. The SAs include information describing the type of security processing that must be done and the encryption keys to be used. Individual security associations describe a one-way connection between two network entities, wherein a bi-directional connection requires two SAs for incoming and outgoing traffic. SAs for incoming traffic are stored partly in an internal SPI table or memory 270 (FIG. 6) and partly in the external SA memory 140. These SA tables are maintained by the host processor 112, which writes indirectly to the SPI table 270 and the SA memory 140 by first writing to an SA data buffer in host memory 128 and then writing a command to the SA address register. This causes the controller 102 to copy the data to the external SA memory 140 and to the internal SPI table memory 270.

One of the fields in an SPI table entry is a hash code calculated by the host 112 according to the IP destination address. In addition, the host 112 calculates a hash code based on the SPI to determine where to write an SPI table. If an incoming or outgoing SA requires authentication, the host CPU calculates the values H(K XOR ipad) and H(K XOR opad) as defined in RFC 2104, HMAC: Keyed-Hashing for Message Authentication, where the host 112 stores the two resulting 128 or 160-bit values in the SA memory 140. If necessary, at initialization time the host CPU can indirectly initialize the Initialization Vector (IV) registers used for Cipher Block Chaining in each of four encryption engines in the IPsec system 124.

Referring to FIGS. 2 and 9, to begin a transmission process, the host processor 112 prepares a transmit frame in one or more data buffers 194 in the host memory 128, writes a transmit descriptor 192 in one of the transmit descriptor rings, and updates the corresponding transmit descriptor write pointer (TX_WR_PTR[x]). The frame data in the data buffers 194 includes space in the IPsec headers for authentication data, for an initialization vector (IV) 63b, 83c, and for an ESP trailer if appropriate. The contents of these fields will be generated by the IPsec system 124 in the controller 102. Similarly, if padding is required (e.g., for alignment or to make the ESP payload an integer multiple of encryption blocks), the padding is included in the host memory buffers 194, and sequence numbers for the AH and ESP SEQUENCE NUMBER fields are provided in the data buffers 194 by the host 112. The IPsec system 124 does not modify these fields unless automatic TCP segmentation is also selected, in which case the IPsec system 124 uses the sequence numbers from the buffers 194 for the first generated frame and then increments these numbers appropriately for the rest of the generated segment frames. If IPsec processing is required for a particular outgoing frame, the corresponding transmit descriptor 192 includes a pointer in the SA_PTR field to the appropriate SA entry in the external SA memory 140, and the IPsec system 124 uses information from the SA to determine how to process the frame. The transmit parser 162 examines the frame to determine the starting and ending points for authentication and/or encryption and where to insert the authentication data, if necessary.

If ESP encryption is required, the IPsec system 124 encrypts the payload data using the algorithm and key specified in the SA. If ESP authentication is required, the system 124 uses the authentication algorithm and IPAD/OPAD information specified in the SA to calculate the authentication data integrity check value (ICV), and stores the results in the authentication data field. If both ESP encryption and authentication are required, the encryption is done first, and the encrypted payload data is then used in the authentication calculations. The encryption and authentication processes are pipelined so that the encryption engine within one of the IPsec processors 174 is processing one block of data while the authentication engine is processing the previous block. The IPsec system 124 does not append padding to the payload data field, unless automatic TCP segmentation is also enabled. The host processor 112 provides the ESP trailer with appropriate padding in the frame data buffers 194 in the system memory 128, and also provides the proper value for the ESP SEQUENCE NUMBER field in the ESP header.

If ESP processing is combined with automatic TCP segmentation, the IPsec system 124 adds any necessary pad bytes to make the encrypted data length a multiple of the block length specified for the selected encryption algorithm. If ESP processing is combined with TCP or UDP checksum generation, the host 112 provides correct NEXT HEADER and PAD LENGTH values for the ESP trailer and the Transmit Descriptor 192. If ESP processing is combined with automatic TCP segmentation, the host 112 provides values for the NEXT HEADER and PAD LENGTH fields of the transmit descriptor 192 that are consistent with the corresponding frame data buffers 194. In this combination, the controller 102 copies the NEXT HEADER field from the transmit descriptor 192 into the ESP trailer of each generated frame, and uses the PAD LENGTH field of the descriptor 192 to find the end of the TCP data field in the frame data buffer 194. In addition, the maximum segment size field MSS[13:0] of the transmit descriptor 192 is decreased to compensate for the IPsec header(s), the ESP padding, and the ICV.

Where ESP processing is combined with TCP segmentation or with TCP or UDP checksum generation, the software driver 190 sets the ESP_AH, IVLEN0, and IVLEN1 bits of the transmit descriptor 192 accordingly. The transmit parser 162 uses this information to locate the TCP or UDP header, and if no TCP or UDP processing is required, these bits are ignored.

The encryption algorithms supported by the IPsec system 124 employ cipher block chaining (CBC) mode with explicit initialization vectors (IVs 63b FIG. 1I, 83c FIG. 1J). To allow a certain amount of parallel processing the IPsec system 124 includes two TX IPSEC processor systems 174a and 174b, each of which comprises a DES/3DES (data encryption standard) encryption system and an advanced encryption standard (AES) encryption engine. Each of the four encryption engines in the TX IPSEC processors 174 includes an IV register, which are cleared to zero on reset. When the controller 102 is enabled, the contents of the IV register associated with an encryption engine are used as the initialization vector 63b, 83c for the first transmit frame encrypted by that engine. Thereafter the last encrypted data block from one frame is used as the IV 63b, 83c for the following frame. The host processor 112 can initialize the IV registers in the IPsec system 124 with random data, for example, by transmitting frames with random data in the payload fields. In one example, the host 112 can put the external PHY device into an isolate mode to prevent these random data frames from reaching the network 108. The IPsec system 124 inserts the IV value 63b, 83c at the beginning of the payload field. The host 112 provides space in the frame data buffer 194 for this field 63b, 83c. The length of the IV 63b, 83c is the same as the encryption block size employed in the TX IPSEC processors 174, for example, 64 bits for the DES and 3DES algorithms, and 128 bits for the AES algorithm.

Where authentication header (AH) processing is selected, the security system 124 employs authentication algorithm and authentication ipad and opad data specified in the SA to calculate the authentication data integrity check value (ICV), and it stores the results in the authentication data field. The transmit IPsec parser 170 detects mutable fields (as defined by the AH specification, RFC 2402) and insures that the contents of these fields and the authentication data field are treated as zero for the purpose of calculating the ICV. In the ICV calculation the IPsec system 124 employs the destination address from the SA rather than the destination address from the packet's IP header, to ensure that if source routing options or extensions are present, the address of the final destination is used in the calculation.

Referring now to FIGS. 2 and 10, the IPsec system 124 provides security processing for incoming (e.g., received) frames from the network 108. The RX parser 144 examines incoming frames to find IPsec headers, and looks up the corresponding SA in the SA memory 140. The RX IPSEC processor 150 then performs the required IPsec authentication and/or decryption according to the SA. If decryption is required, the processor 150 replaces the original ciphertext in the frame with plaintext in the memory 116. The descriptor management unit 130 sets status bits in the corresponding receive status ring entry to indicate what processing was done and any errors that were encountered.

Figure 6:
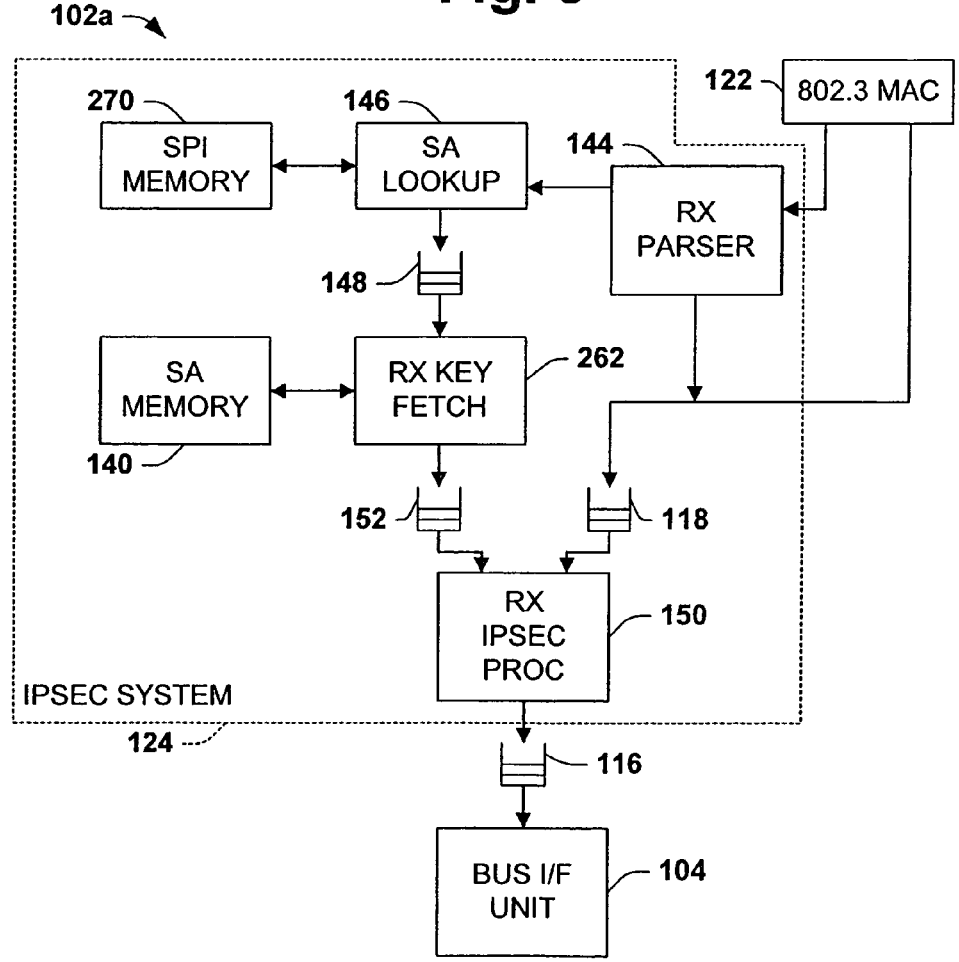
FIG. 6 is a schematic diagram illustrating security processing of incoming network data in the network interface device of FIG. 3.

FIG. 6 illustrates the flow of incoming data through the IPsec system 124. The receive parser 144 examines the headers of incoming frames from the MAC engine 122 while the incoming frame is being received from the network 108. The parser 144 passes the results of its analysis to the SA lookup logic 146. This information is also provided to the memory 118 in the form of a control block that is inserted between frames. The control block includes information about the types and locations of headers in the incoming frame. If the parser 144 finds that a frame includes an IP packet fragment, IPsec processing is bypassed, and the frame is passed on to the host memory 128 with the IP Fragment bit being set in the IPSEC_STAT1 field in the corresponding receive status ring entry. For IPv4 frames, a fragment is identified by a non-zero fragment offset field or a non-zero more fragments bit in the IPv4 header. For IPv6 packets, a fragment is indicated by the presence of a fragment extension header.

If the parser 144 finds an IPsec header or an acceptable combination of headers, it passes the SPI, the IP destination address, and a bit indicating the IPsec protocol (AH or ESP) to the SA lookup engine 146. The SA lookup engine 146 uses the SPI, protocol bit, and a hash of the destination address to search an internal SPI memory 270 (FIG. 6). The results of this search are written to the SA pointer FIFO 148, including a pointer to an entry in the external SA memory 140, a bit that indicates whether IPsec processing is required, and two bits that indicate the success or failure of the SA lookup. The SA pointer FIFO 148 includes an entry corresponding to each incoming frame in the memory 118. If the SA pointer FIFO 148 does not have room for a new entry at the time that an incoming frame arrives from the network 108 or if the received frame would cause the receive portion of the memory 118 to overflow, the frame is dropped, and a receive missed packets counter (not shown) is incremented.

An RX KEY FETCH state machine 262 (FIG. 6) retrieves the corresponding entry from the SA pointer FIFO 148 and determines what, if any, processing is required. If the control bits indicate that processing is required, the state machine 262 uses the contents of the pointer field to fetch the SA information from the external SA memory 140. If a DA field of the SA does not match the DA field of the IP header in the frame, the Ipsec processor 150 causes an error code to be written to the receive status ring and passes the frame to the memory 118 unmodified. If the DA field of the SA matches the DA field of the IP header, the processor 150 decrypts the payload portion of the received frame and/or checks the authentication data as required by the SA.

Figure 7A:
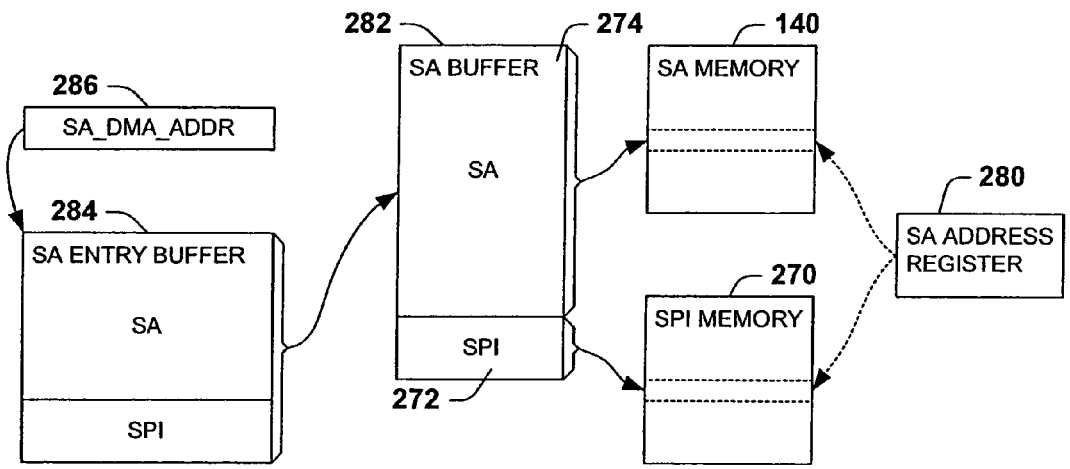
FIG. 7A is a schematic diagram illustrating an exemplary security association table write access in the network interface device of FIG. 3.
Figure 7B:
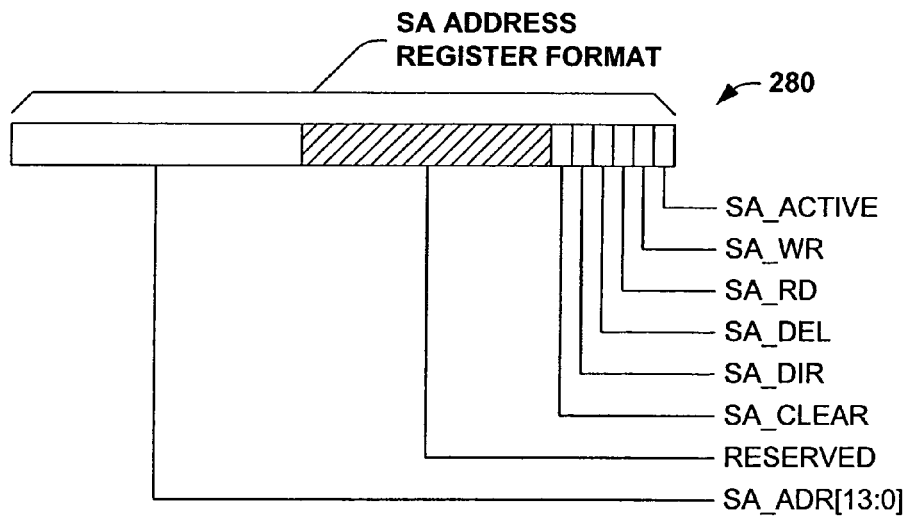
FIG. 7B is a schematic diagram illustrating an exemplary SA address register format in the network interface device of FIG. 3.
Figure 7C:
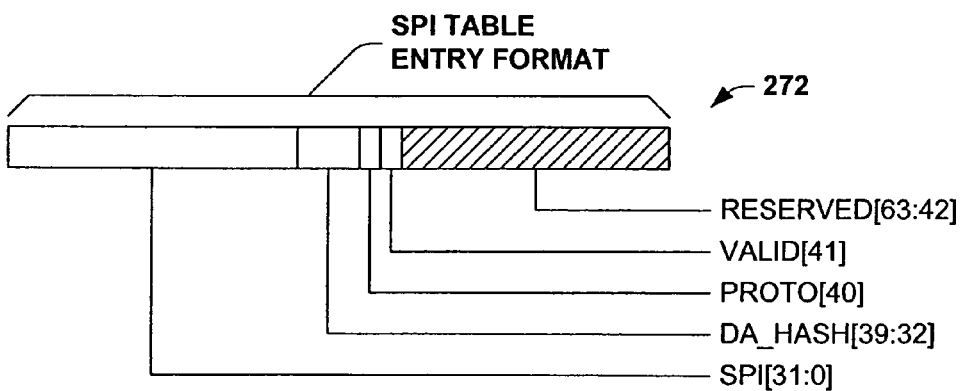
FIG. 7C is a schematic diagram illustrating an exemplary SPI table entry format in the network interface device of FIG. 3.
Figure 7D:
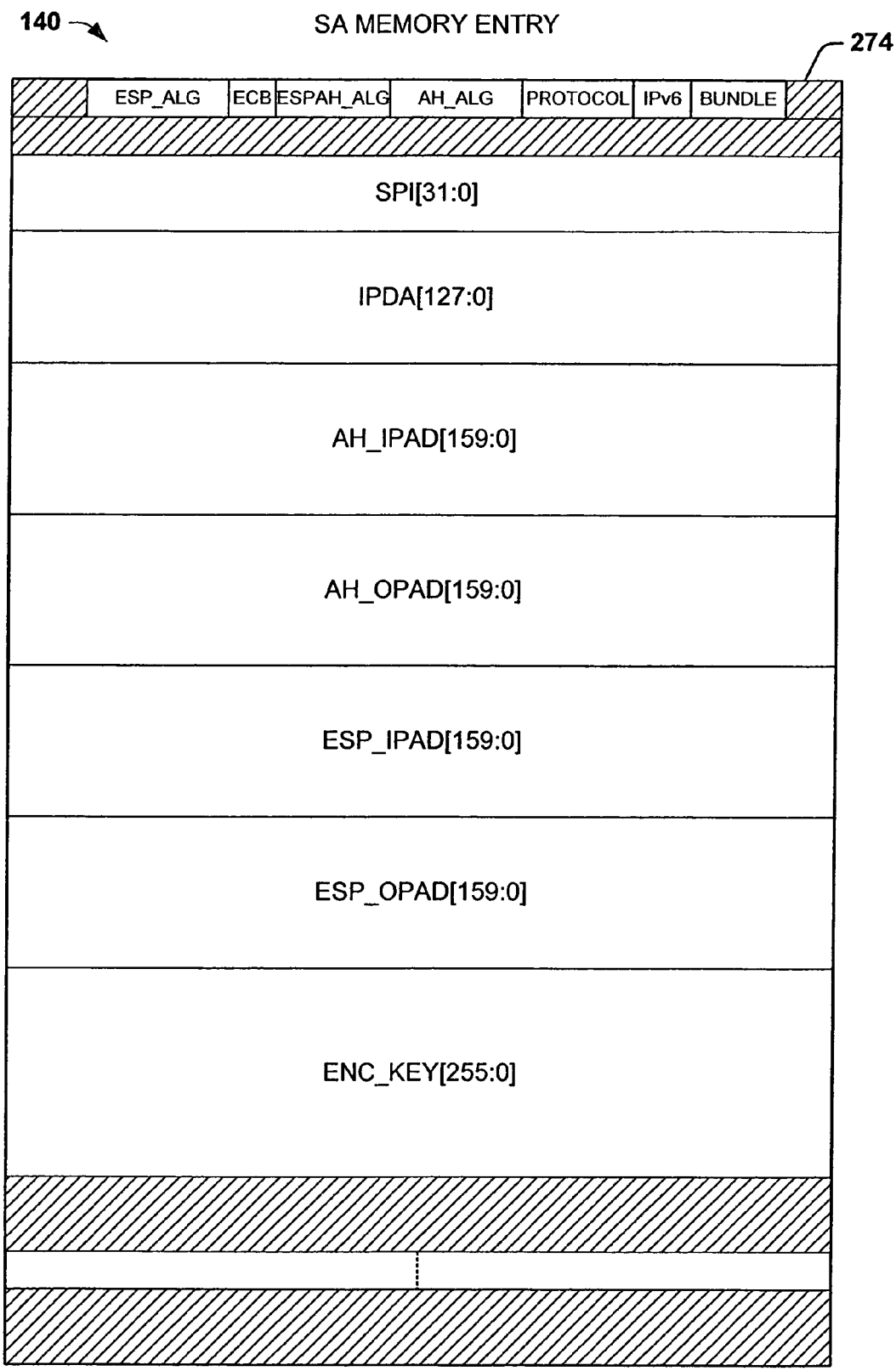
FIG. 7D is a schematic diagram illustrating an exemplary SA memory entry format in the network interface device of FIG. 3.

Referring also to FIGS. 11A-11D, the security association system used in outgoing IPsec processing in the exemplary controller 102 is hereinafter described. FIG. 7A illustrates an exemplary security association table write access, FIG. 7B illustrates an exemplary SA address register format, FIG. 7C illustrates an exemplary SPI table entry in the SPI memory 270, and FIG. 7D illustrates an exemplary SA memory entry in the SA memory 140. The SA lookup engine 146 uses the SPI memory 270 and the external SA memory 140, both of which are maintained by the host processor 112, where the exemplary SPI memory 270 is organized as a collection of 4096 bins, each bin having up to 4 entries. The address of an entry in the SPI memory 270 is 14 bits long, with the 12 high order bits thereof indicating a bin number. As illustrated in FIG. 7C, each SPI table entry 272 in the SPI memory 270 includes a 32-bit security parameters index SPI[31:0], a hash of the destination address DA_HASH[39:32], a protocol bit PROTO indicating the security protocol (e.g., AH or ESP), and a VALID bit indicating whether the entry is valid or unused.

FIG. 7D illustrates an exemplary entry 274 in the SA memory 140, wherein the SA memory 140 includes an entry corresponding to each entry 272 in the SPI memory 270, with entries 274 and 272 in the two memories 140 and 270 being in the same order. The entry 274 includes a three bit ESP encryption algorithm field ESP_ALG indicating whether ESP encryption is required, and if so, which algorithm is to be employed (e.g., DES; 3DES; AES-128, 10 rounds; AES-192, 12 rounds; AES-256, 14 rounds; etc.). An electronic codebook bit ECB indicates whether ECB mode is used for encryption, and a two bit ESP authentication field ESPAH_ALG indicates whether ESP authentication is required, and if so, which algorithm is to be employed (e.g., MD5, SHA-1, etc.). A two bit AH field AH_ALG indicates whether AH processing is required, and if so which algorithm is to be employed (e.g., MD5, SHA-1, etc.). A protocol bit PROTOCOL indicates whether the first IPsec header is an ESP header or an AH header, and an IPv6 bit indicates whether the SA is defined for IPv4 or IPv6 frames.

A BUNDLE bit indicates a bundle of two SAs specifying AH followed by ESP, and a 32 bit SPI field specifies an SPI associated with the second SA (e.g., ESP) in a bundle of 2 SAs, which is ignored for SAs that are not part of bundles. An IP destination address field IPDA[127:0] indicates the address to which the SA is applicable, wherein the SA applies only to packets that contain this destination address. An AH_IPAD field includes a value obtained by applying the appropriate authentication hash function (e.g., MD5 or SHA-1) to the exclusive OR of the AH authentication key and the HMAC ipad string as described in RFC 2104. If the authentication function is MD5, the result is 16 bytes, which are stored in consecutive bytes starting at offset 24. If the authentication function is SHA-1, the result is 20 bytes, which occupies the entire AH_IPAD field.

An AH_OPAD field includes a value obtained by applying the appropriate authentication hash function (e.g., MD5 or SHA-1) to the exclusive OR of the AH authentication key and the HMAC opad string as described in RFC 2104. If the authentication function is MD5, the result is 16 bytes, which are stored in consecutive bytes starting at offset 44. If the authentication function is SHA-1, the result is 20 bytes, which occupies the entire AH_OPAD field. The SA memory entry 274 also includes an ESP_IPAD field having a value obtained by applying the authentication hash function (MD5 or SHA-1) to the exclusive OR of the ESP authentication key and the HMAC ipad string as described in RFC 2104, as well as an ESP_OPAD field including a value obtained by applying the authentication hash function (MD5 or SHA-1) to the exclusive OR of the ESP authentication key and the HMAC opad string as described in RFC 2104. An encryption key field ENC_KEY includes an encryption/decryption key used for ESP processing.

The IPsec system 124 reads from the SA and SPI memories 140 and 270, respectively, but does not write to them. To minimize the lookup time the SPI memory 270 is organized as a hash table in which the bin number of an entry 272 is determined by a hash function of the SPI. The lookup logic 146 uses the SPI and the IPsec protocol (AH or ESP) to search the SPI memory 270, by computing a hash value based on the SPI and using the result to address a bin in the SPI memory 270. A second hash value is computed for the IP destination address, and the lookup logic 146 compares the SPI, protocol, and destination address hash with entries in the selected bin until it either finds a match or runs out of bin entries. The lookup logic 146 then writes an entry into the SA pointer FIFO 148, including the address of the matching entry in the SPI memory 270 and an internal status code that indicates whether or not IPsec processing is required and whether or not the SA lookup was successful. The Rx key fetch logic 262 fetches the DA from the SA memory 140 to compare with the DA in the IP packet header. If the DA from the SA memory 140 does not match the DA from the received frame, the frame is passed on to host memory 128 via the memory 116 and the bus interface 106 without IPsec processing, and the corresponding receive status ring entry indicates that no IPsec processing was done.

Referring also to FIG. 7A, the SA memory 140 and the SPI memory 270 are maintained by the host processor 112. During normal operation, the host 112 uses write and delete accesses to add and remove table entries 274, 272. The exemplary SA memory 140 is divided into two regions, one for incoming SAs and one for outgoing SAs, wherein each region provides space for 16K entries. Access to the SA and SPI memories 140 and 270 by the host 112 is performed using an SA address register SA_ADDR 280 and a 144-byte SA buffer 282. The SA buffer 282 holds one 136-byte SA memory entry 274 followed by a corresponding 8-byte SPI table entry 272. For outgoing SAs, the SPI table entry section 272 of the buffer 282 is not used. To write an SA table entry, the host 112 creates a 136 or 144 byte entry in the host memory 128 and writes the target address in the SA memory 140 to the SA_ADDR register 280. The controller 102 uses DMA to copy the SA information first to the internal SA Buffer 282 and then to the appropriate locations in the SA memory 140 and the SPI memory 270. The host 112 writes the physical address of an SA entry buffer 284 in the host memory 128 to an SA_DMA_ADDR register 286. If the software driver 190 uses the same buffer 284 in host memory 128 for loading all SA table entries, it only has to write to the SA_DMA_ADDR register 286 once.

Incoming security associations are stored in locations determined by the hash algorithm. For outgoing (transmit) frames the driver software 190 includes a pointer to the appropriate SA in the transmit descriptor 192. This makes it unnecessary for the controller 102 to search the SA memory 140 for outgoing SAs, and transmit SAs can be stored in any order. No outgoing SA is stored at offset 0, since the value 0 in the SA_PTR field of the descriptor 192 is used to indicate that no IPsec processing is required.

Referring also to FIG. 7B, the SA address register 280 includes the address of the SA table entries 274 to be accessed plus six SA access command bits. These command bits include SA read, write, delete, and clear bits (SA_RD, SA_WR, SA_DEL, and SA_CLEAR), an SA direction bit SA_DIR, and a command active bit SA_ACTIVE. The read-only SA_ACTIVE bit is 1 while the internal state machine 262 is copying data to or from the SA buffer 282, during which time the host 112 refrains from accessing the SA buffer 282. Selection between the incoming and outgoing regions of the external SA memory 140 is controlled by the SA_DIR bit, which acts as a high-order address bit. This bit is set to 1 for an incoming SA or to 0 for an outgoing SA. If this bit is set to 1, data is transferred to or from the internal SPI memory 270 as well as to or from the external SA memory 140. Outgoing SA table accesses affect only the external SA memory 140. When the host 112 sets the SA_RD in the SA address register 280, a state machine copies data from the external SA memory 140 to the SA buffer 282. If the direction bit SA_DIR is 1, the corresponding entry 272 from the internal SPI memory 270 is also copied to the SA buffer 282. An SA address field SA_ADR[13:0] of the SA address register 280 points to the entries 272 and/or 274 to be copied.

When the host 112 sets the SA_WR bit in the SA_ADDR register 280, the resulting action depends on the value of the SA_DIR bit. If this bit is 1 (e.g., indicating an incoming SA), the state machine copies data first from the buffer 284 in host memory 128 into the internal SA buffer 282, and then from the SA buffer 282 into the external SA memory 140 and also into the corresponding internal SPI memory 270. If the SA_DIR bit is 0 (e.g., indicating a transmit SA), when the access command is 'write', only the SA field of the SA buffer 282 is copied to the SA memory 140 entry selected by the SA address register 280, and the SPI field is not copied. For bundle processing, a BUNDLE bit is set in the SA corresponding to the first IPsec header in the frame, indicating that the frame is expected to include an AH header followed by an ESP header. The corresponding entry in the external SA memory 140 includes information for both these headers, including the expected SPI of the second IPsec header.

For receive AH processing, the value of the AH_ALG field in the SA memory entry 274 is non-zero, indicating that AH processing is required for the received frame. The Rx parser 144 scans the frame IP header (e.g., and IPv6 extension headers if present) to determine the locations of mutable fields, as set forth in RFC 2402). The parser 144 inserts a list of these mutable field locations into the control block in the memory 118. If AH processing is enabled, the IPsec processor 150 replaces the mutable fields and the ICV field of the AH header with zeros for the purpose of calculating the expected ICV (the frame data that is copied to the host memory 128 is not altered). The destination address field of the IP header is considered to be mutable but predictable, because intermediate routers may change this field if source routing is used. However, since the originating node uses the final destination address for the ICV calculation, the receiver treats this field as immutable for its ICV check.

The control block in the memory 118 includes pointers to the starting and ending points of the portion of the received frame that is covered by AH authentication. The IPsec processor 150 uses this control block information to determine where to start and stop its authentication calculations. The AH_ALG field in the SA memory entry 274 indicates which authentication algorithm is to be used. The exemplary IPsec system 124 provides HMAC-SHA-1-96 as defined in RFC 2404 and HMAC-MD5-96 as defined in RFC 2403 for AH processing. In either case the Rx IPsec processor 150 uses preprocessed data from the AH_IPAD and AH_OPAD fields of the SA entry 274 along with the frame data to execute the HMAC keyed hashing algorithm as described in RFC 2104. If the results of this calculation do not match the contents of the authentication data field of the AH header, the AH_ERR bit is set in the corresponding receive status ring entry.

For receive ESP processing, the ESPAH_ALG field of the SA memory entry 274 is non-zero, indicating that ESP authentication is required, and the non-zero value indicates which authentication algorithm will be employed (e.g., MD5, SHA-1, etc.). The Rx IPsec processor 150 uses the preprocessed ipad and opad data from the ESP_IPAD and ESP_OPAD fields of the SA entry 274 along with frame data to execute the HMAC keyed hashing algorithm as described in RFC 2104. It uses pointers extracted from the control block of the memory 118 to determine what part of the frame to use in the ICV calculation. The data used in the calculation start at the beginning of the ESP header and ends just before the authentication data field of the ESP trailer, wherein none of the fields in this range are mutable. If the results of this ICV calculation do not match the contents of the authentication data field in the ESP trailer, the ESP_ICV_ERR bit is set in the corresponding receive status ring entry.

If the ESP_ALG field of the SA memory entry 274 is non-zero, ESP decryption is required, and the receive IPsec processor 150 uses the ESP_ALG and ECB fields of the entry 274 to determine which decryption algorithm and mode to use (e.g., DES; 3DES; AES-128, 10 rounds; AES-192, 12 rounds; AES-256, 14 rounds; etc.). The Rx IPsec processor 150 retrieves the decryption key from the ENC_KEY field of the entry 274, and uses information from the control block in the memory 118 to determine which part of the frame is encrypted (e.g., the portion starting just after the ESP header and ending just before the authentication data field of the ESP trailer). If the SA indicates that no ESP authentication is to be performed, the length of the authentication data field is zero and the encrypted data ends just before the FCS field.

Once the payload has been decrypted, the IPsec processor 150 checks the pad length field of the ESP trailer to see if pad bytes are present. If the pad length field is non-zero, the processor 150 examines the pad bytes and sets the PAD_ERR bit in the receive status ring entry if the pad bytes do not consist of an incrementing series of integers starting with 1 (e.g., 1, 2, 3, . . . ). The IPsec processor 150 replaces the encrypted frame data with (decrypted) plaintext in the memory 118. The exemplary processor 150 does not reconstruct the original IP packet (e.g., the processor 150 does not remove the ESP header and trailer and replace the Next Header field of the previous unencrypted header). If the encryption uses CBC mode, the first 8 or 16 bytes of the ESP payload field contain the unencrypted IV, which the IPsec processor 150 does not change. The encrypted data following the IV is replaced by its decrypted counterpart.

In the exemplary IPsec system 124, the SPI table bin number and the IP destination address hash codes are both calculated using a single 12-bit hash algorithm. The bin number is calculated by shifting the SPI through hash logic in the IPsec processor 150. For the destination address (DA) hash, the 32-bit IPv4 destination address or the 128-bit IPv6 destination address is shifted through the hashing logic, which provides 12 output bits used for the bin number, where only the 8 least significant bits are used for the DA hash. The hash function is defined by a programmable 12-bit polynomial in a configuration register of the controller 102, wherein each bit in the polynomial defines an AND/XOR tap in the hash logic of the processor 150. The incoming bit stream is exclusive-ORed with the output of the last flip-flop in the hash function. The result is ANDed bitwise with the polynomial, exclusive-ORed with the output of the previous register, and then shifted. The hash function bits are initialized with zeros. The search key is then passed through the hash function. After the input bit stream has been shifted into the hash function logic, the 12-bit output is the hash key.

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A security processing circuit for performing 3DES encryption or decryption services using a single DES engine, the security processing circuit comprising:
    the single DES engine operable to provide security processing, the single DES engine employing an intermediate result at a data output of the single DES engine, the single DES engine further comprising a data input node adapted to selectively process input data from a data input of the security processing circuit during a first DES processing operation, and subsequently to process the intermediate result data from the data output during a second and third DES processing operation, respectively;
    a select switch coupled to the data input of the security processing circuit, the data output, and the data input node of the single DES engine, the select switch adapted to selectively couple one of the data input and the intermediate result to the data input node of the single DES engine;
    a set of cipher keys selectively coupled to the single DES engine, wherein the security processing circuit is operable to select and load a different cipher key associated with each DES processing operation to the single DES engine during the three single DES processing operations of the 3DES security processing; and
    a clock input coupled to the single DES engine for timing clock cycles of the first, second and third single DES processing operations,
        wherein the 3DES processing is completed in eight clock cycles, or
        wherein the first, second and third DES processing operations have a duration comprising two clock cycles each.

2. The security processing circuit of claim 1, wherein the select switch is operable to selectively couple one of the data input and the intermediate result to the single DES engine according to the state of a selection signal coupled to the select switch.

3. The security processing circuit of claim 2, wherein the select switch comprises a multiplexor.

4. The security processing circuit of claim 1, wherein the set of cipher keys comprise three different cipher keys, each cipher key associated with one of the three DES processing operations of the 3DES security processing.

5. The security processing circuit of claim 4, further comprising a key select switch connected to inputs associated with the three cipher keys and a key data node of the single DES engine, the key select switch operable to selectively couple one of the three cipher keys associated with a DES processing operation to the single DES engine during the three DES processing operations of the 3DES security process.

6. The security processing circuit of claim 1, wherein the set of cipher keys selectively coupled to the single DES engine are selected and coupled using a multiplexor residing between the set of cipher keys and the single DES engine and wherein the set of cipher keys are connected to a set of multiplexor inputs and the single DES engine is connected to the multiplexor output.

7. The security processing circuit of claim 1, wherein the clock cycle has a period of about 8 ns.

8. The security processing circuit of claim 1, wherein the eight clock cycles of the 3DES security processing comprise:
    a data input latch cycle;
    a first DES processing operation comprising two cycles;
    a second DES processing operation comprising two cycles;
    a third DES processing operation comprising two cycles; and
    a data output latch cycle.

9. The security processing circuit of claim 1, further comprising a segmentation system coupled with the security processing circuit, the segmentation system adapted to selectively segment outgoing data from the host system to create segment frames for transmission to a network.

10. The security processing circuit of claim 1, wherein the security processing circuit resides within a network interface device of a host system for performing 3DES encryption and decryption services for the host system using a single DES engine.

11. The security processing circuit of claim 1, further comprising a network interface device coupled with the security processing circuit, the network interface device being adapted to selectively encrypt outgoing data from a host system to cryptographically process data for transmission to a network.

12. The security processing circuit of claim 11, wherein the network interface device comprises a bus interface, a media access control system, and the security processing circuit.

13. The security processing circuit of claim 12, wherein the network interface device comprises a single integrated circuit.

14. The security processing circuit of claim 1, wherein the circuit comprises an IPsec circuit adapted to selectively provide authentication, encryption, and decryption functions for incoming and outgoing data.

15. A network interface device for interfacing a host system with a network to provide outgoing data from the host system to the network and to provide incoming data from the network to the host system, the network interface device comprising:
 a bus interface coupled with a host bus in the host system, the bus interface being adapted to transfer data between the network interface device and the host system;
 a media access control system coupled between the network interface device and the network, the media access control system being adapted to transfer data between the network interface device and the network;
 a security processing circuit coupled between the bus interface and the media access control system, the security processing circuit adapted to selectively encrypt outgoing data and to selectively decrypt incoming data, the security processing circuit comprising a single DES engine operable to perform 3DES processing of data by selectively feeding back intermediate data results to an input thereof to perform additional processing on the data; and
 a clock input coupled to the single DES engine for timing clock cycles of first, second and third single DES processing operations of the 3DES processing.

16. The network interface device of claim 15, wherein the bus interface comprises a PCI-X bus interface coupled with a host PCI or PCI-X bus, and
 wherein the 3DES processing is completed in eight clock cycles, or
 wherein the first, second and third DES processing operations have a duration comprising two clock cycles each.

17. The network interface device of claim 15, wherein the media access control system comprises a MAC engine adapted to operate an Ethernet node and to provide an interface between the host system and the network.

18. The network interface device of claim 15, wherein the security processing circuit comprises an IPsec system adapted to selectively provide authentication, encryption, and decryption functions for incoming and outgoing data.

19. A method of 3DES processing security information from a host system to a network using a network interface device to 3DES process outgoing data from the host system to the network and to 3DES process incoming data from the network to the host system, the method comprising:
 transferring data between the network interface device and the host system using a bus interface;
 transferring data between the network interface device and the network using a media access control system;
 obtaining security information from the host system, the security information being associated with outgoing data;
 storing the outgoing data from the bus interface into a 3DES processing circuit;
 selectively performing security processing on the outgoing data encrypting the data according to security key information and storing the outgoing data in the 3DES processing circuit using a single DES engine having a clock input for timing clock cycles of the first, second and third single DES processing operations, wherein the first, second and third DES processing operations have a duration of two clock cycles each;
 transferring the outgoing data from the 3DES processing circuit to the network interface device using the interface bus; and
 transferring the outgoing data from the interface bus to the network using the media access control system.

20. The method of claim 19, wherein selectively performing the security processing on the outgoing data comprises selectively encrypting the outgoing data using the security processing circuit.

21. A method of performing 3DES encryption or decryption processing using a security processing circuit employing a single DES engine within a network interface device, the method comprising:
 latching input data to a DataIn bus of the security processing circuit from the network interface device;
 latching key data to a Key bus of the security processing circuit from the network interface device;
 selecting and coupling the input data to an input data node of the single DES engine using a data select switch during a first DES processing operation;
 selecting and coupling a first key from the key data to a key data node of the single DES engine using a key select switch during the first DES processing operation, the first key associated with the input data;
 first DES processing the input data with the associated first key using the single DES engine of the security processing circuit;
 obtaining a first intermediate result data from the first DES processing operation at a DataOut bus of the security processing circuit, the intermediate result being feedback coupled to a feedback input of the data select switch;
 selecting and coupling the intermediate result data to the input data node of the single DES engine using the data select switch during a second DES processing operation;
 selecting and coupling a second key from the key data to the key data node of the single DES engine using the key select switch during the second DES processing operation, the second key associated with the intermediate result data;
 second DES processing the intermediate result data with the associated second key;
 obtaining a second intermediate result from the second DES processing operation at the DataOut bus of the security processing circuit, the second intermediate result being feedback coupled to the feedback input of the data select switch;
 selecting and coupling the second intermediate result data to the input data node of the single DES engine using the data select switch during a third DES processing operation;
 selecting and coupling a third key from the key data to the key data node of the single DES engine using the key select switch during the third DES processing operation, the third key associated with the second intermediate result data;
 third DES processing the second intermediate result data with the associated third key to obtain a third result from the third DES process operation; and
 latching data from the third result to the DataOut bus of the security processing circuit.

22. The method of claim 21, further comprising transferring the data on the DataOut bus of the security processing circuit to the network interface device.

23. A method of performing 3DES cryptographic processing between a network and a host system using a security processing circuit employing a single DES engine within a network interface device to encrypt outgoing data from the host system to the network and to decrypt incoming data from the network to the host system, the method comprising:

latching input data to a DataIn bus of the network interface device, the input data associated with incoming data from the network during decryption, and associated with outgoing data from the host system during encryption;

latching key data to a Key bus of the network interface device;

selecting and coupling the input data to an input data node of the single DES engine using a data select switch during a first DES processing operation;

selecting and coupling a first key from the key data to a key data node of the single DES engine using a key select switch during the first DES processing operation, the first key associated with the input data;

first DES processing the input data with the associated first key using the single DES engine of the security processing circuit;

obtaining a first intermediate result data from the first DES processing operation at a DataOut bus of the security processing circuit, the intermediate result being feedback coupled to a feedback input of the data select switch;

selecting and coupling the intermediate result data to the input data node of the single DES engine using the data select switch during a second DES processing operation;

selecting and coupling a second key from the key data to the key data node of the single DES engine using the key select switch during the second DES processing operation, the second key associated with the intermediate result data;

second DES processing the intermediate result data with the associated second key;

obtaining a second intermediate result from the second DES processing operation at the DataOut bus of the security processing circuit, the second intermediate result being feedback coupled to the feedback input of the data select switch;

selecting and coupling the second intermediate result data to the input data node of the single DES engine using the data select switch during a third DES processing operation;

selecting and coupling a third key from the key data to the key data node of the single DES engine using the key select switch during the third DES processing operation, the third key associated with the second intermediate result data;

third DES processing the second intermediate result data with the associated third key to obtain a third result from the third DES process operation;

latching the third result data to the DataOut bus of the security processing circuit; and transferring the output data on the DataOut bus of the security processing circuit to the network interface device, the output data associated with outgoing data from the host system to the network during encryption, and during decryption the output data associated with incoming data from the network to the host system.

24. A security processing circuit for performing 3DES encryption or decryption services using a single DES engine, the security processing circuit comprising:

the single DES engine operable to provide security processing, the single DES engine employing an intermediate result at a data output of the single DES engine, the single DES engine further comprising a data input node adapted to selectively process input data from a data input of the security processing circuit during a first DES processing operation, and subsequently to process the intermediate result data from the data output during a second and third DES processing operation, respectively;

a select switch coupled to the data input of the security processing circuit, the data output, and the data input node of the single DES engine, the select switch adapted to selectively couple one of the data input and the intermediate result to the data input node of the single DES engine; and a set of cipher keys selectively coupled to the single DES engine, wherein the security processing circuit is operable to select and load a different cipher key associated with each DES processing operation to the single DES engine during the three DES processing operations of the 3DES security processing; and a clock input coupled to the single DES engine for timing clock cycles of the first, second and third single DES processing operations, wherein the 3DES security processing is completed in eight clock cycles.

* * * * *